(12) United States Patent
Akiyoshi et al.

(10) Patent No.: US 7,151,857 B2
(45) Date of Patent: Dec. 19, 2006

(54) IMAGE INTERPOLATING METHOD AND APPARATUS

(75) Inventors: Kozo Akiyoshi, Tokyo (JP); Nobuo Akiyoshi, Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 565 days.

(21) Appl. No.: 09/991,911

(22) Filed: Nov. 26, 2001

(65) Prior Publication Data

US 2002/0118751 A1   Aug. 29, 2002

(30) Foreign Application Priority Data

Nov. 28, 2000  (JP)  ............... 2000-360601
Apr. 16, 2001  (JP)  ............... 2001-116351

(51) Int. Cl.
G06K 9/36    (2006.01)
H04N 7/12    (2006.01)

(52) U.S. Cl. .................. 382/243; 375/240.12

(58) Field of Classification Search ............... 382/236, 382/243, 238, 240, 300, 232, 298, 293, 276; 375/240.12, 240.25, 240.16, 240.18, 240.01, 375/240.1; 348/699
See application file for complete search history.

(56) References Cited

U.S. PATENT DOCUMENTS

| | | | | |
|---|---|---|---|---|
| 5,654,761 A | * | 8/1997 | Jung ................. | 375/240.16 |
| 5,764,807 A | * | 6/1998 | Pearlman et al. ........ | 382/240 |
| 5,940,129 A | * | 8/1999 | Burns .................. | 375/240.25 |
| 5,978,030 A | * | 11/1999 | Jung et al. ............. | 375/240.16 |
| 6,018,592 A | | 1/2000 | Shinagawa et al. ....... | 382/195 |
| 6,137,910 A | | 10/2000 | Shinagawa et al. ....... | 382/195 |

FOREIGN PATENT DOCUMENTS

| | | |
|---|---|---|
| JP | 08-251420 | 9/1996 |
| JP | 10-269355 | 9/1998 |
| WO | WO/98/59321 | 12/1998 |
| WO | WO/00/17820 | 3/2000 |

OTHER PUBLICATIONS

Japanese Patent Office, Notification of Reasons for Refusal, Jan. 31, 2006.
English Abstract of JP Application 09-095318, Publication No. 10-269355, Sep. 10, 1998, Patent Abstracts of Japan, Japanese Patent Office Website.
Japanese Patent Office, Decision of Refusal, Jun. 27, 2006.
English Abstract of JP Application 07-053846, Publication No. 08-251420, Sep. 27, 1996, Patent Abstracts of Japan, Japanese Patent Office Website.

* cited by examiner

Primary Examiner—Wenpeng Chen

(57) ABSTRACT

An image input unit acquires a first image and a second image. A matching processor computes a matching between those images such that corresponding points are obtained on the second image with respect to lattice points of a mesh taken on the first image and generates a corresponding point file based on the matching. The corresponding point file comprises positional information on the corresponding points and difference data on attribute values of the corresponding points. An intermediate image generator generates an intermediate image of the first image and the second image, based on the first image and the corresponding point file. In particular, for an attribute such as color, the color difference data on a pair of corresponding points of the first image and second image are used when interpolating, such that the second image is not needed in the interpolation.

19 Claims, 18 Drawing Sheets

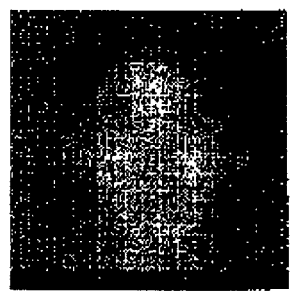 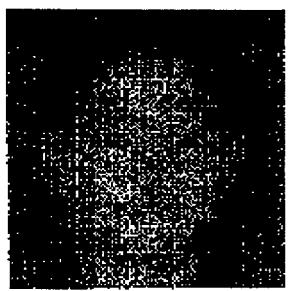
Fig.1a  Fig.1b
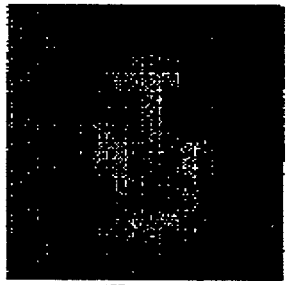 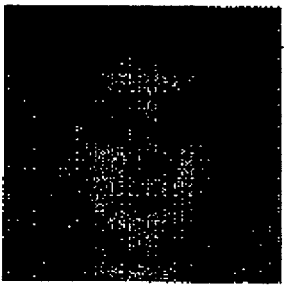
Fig.1c  Fig.1d
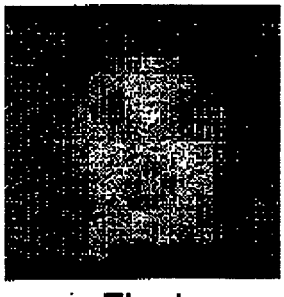 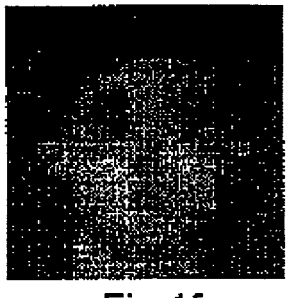
Fig.1e  Fig.1f
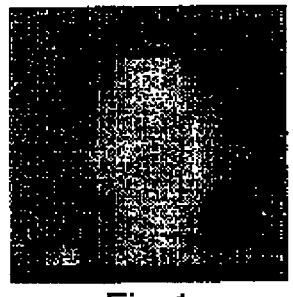 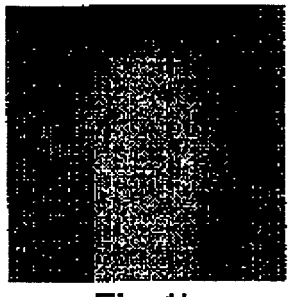
Fig.1g  Fig.1h
 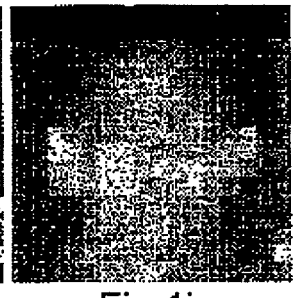
Fig.1i  Fig.1j

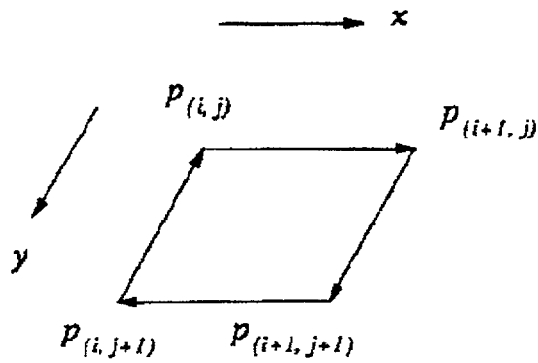
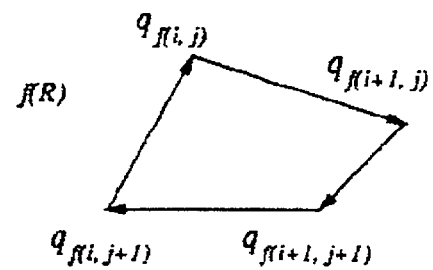
Fig.2A
Fig.2R
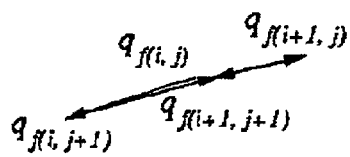
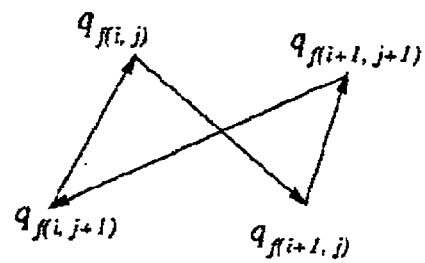
Fig.2E
Fig.2B
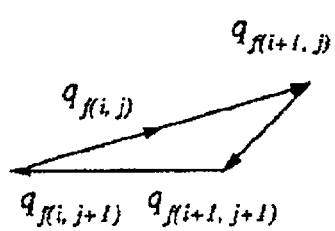
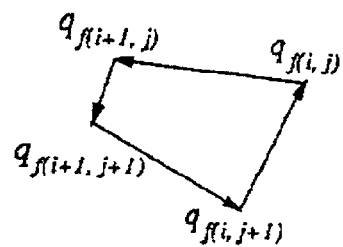
Fig.2D
Fig.2C

Fig. 9

IMAGE INTERPOLATING METHOD AND APPARATUS

BACKGROUND OF THE INVENTION

1. Field of the Invention

The present invention relates to an image interpolation method and apparatus, and more particularly relates to a method and apparatus for interpolating two images based on a matching technique.

2. Description of the Related Art

A very large number of users have begun connecting to the Internet utilizing portable telephones. That is, besides normal telephone call usage, the portable telephone is being used more and more for Web services via the Internet and for electronic mail services. In particular, portable telephones are being used to browse data, which can be transmitted and received on a text basis, such as timetable and stock prices, as well as to browse Web pages specialized for portable telephones.

Further, color liquid crystal displays (LCDs) have recently been employed in the display unit of portable telephones, and distribution of still images and motion pictures in which relatively simple images are dominant has started. Thus, text, images, and motion pictures can now be utilized on portable telephones, so that portable telephones, which were originally designed primarily for audio usage, are now establishing a position as wearable computers.

However, the value of portable telephones lies primarily in their light weight, long battery life, economical hardware, smooth operability and so forth, thus, it is undesirable to take a long time or a large expense to download heavy image or motion picture data (i.e. images or motion pictures generally require large amounts of data). Moreover, the CPU power required to process such heavy image data can be disadvantageous in terms of the power consumed.

SUMMARY OF THE INVENTION

The present invention has been made in view of the foregoing circumstances and an object thereof is to provide an image interpolation technique, method and apparatus by which motion pictures can be generated and displayed based on a small amount of image data.

The present invention relates to an image interpolation technique. This technique can utilize the image matching technique (referred to as the "premised technology" hereinafter) proposed in Japanese Patent No. 2927350 by the same inventors of the present patent application.

An embodiment according to the present invention relates to an image interpolation method. This method is a coding method to generate data which are used for interpolating two images (a first image and a second image, hereinafter) and the method includes: acquiring a first image and a second image; computing a matching between the first image and the second image and detecting points which correspond between the images; and generating a corresponding point file, wherein the corresponding point file comprises positional information on the corresponding points and difference data on attribute values of the corresponding points. It is to be noted that "points" and "pixels" are used somewhat interchangeably hereinafter, however, when called a "point", the point may have an area greater than one pixel, namely, it may be a region. Further, an "attribute value" or a "pixel value" refers to values of any arbitrary attributes of a point or pixel, such as color, which is sometimes used in examples hereinafter.

As an example based on the premised technology, suppose, as a result of the matching, that it is known that a point $p_1$ $(x_1, y_1)$ of the first image corresponds to a point $p_2$ $(x_2, y_2)$ of the second image. Moreover, suppose that the pixel values (using color values hereinafter) of these points are $v_1$ and $v_2$, respectively. In this case, an intermediate image of the first image and second image can be generated by interpolating the coordinates of these points. Namely, in the intermediate image, the position of a point (hereinafter referred to as an interpolation point) moved from the point $p_1$ is expressed in the following formula.

$$((1-t)x_1+tx_2, (1-t)y_1+y_2)$$

In a similar way, in the premised technology, the color of the interpolation point is set to $$(1-t)v_1+tv_2$$

by interpolating the color $v_1$ of the point $p_1$ of the first image and the color $v_2$ of the point $p_2$ of the second image.

In contrast thereto, rather than referring to the second image for purposes of interpolating the color, it is possible to refer to difference data of colors of points which correspond between the first image and the second image (the points also being referred to as a pair of corresponding points, hereinafter). In this case, the difference data is saved in the corresponding point file. Thus, in the above embodiment there is no need to refer to the second image in interpolation. More specifically, when the difference data is defined to be $\Delta v = v_2 - v_1$, the colors of the above-described point $p_1$ of the first image and the point $p_2$ of the second image can be described, in an interpolation point on the intermediate image, as $$v_1 + t\Delta v.$$

The interpolation technique according to the present invention is advantageous in memory usage efficiency and in transmission or streaming of image data in the sense that there is no need to acquire the second image in advance of its temporal order for interpolation purposes. Moreover, since the pair of corresponding points are naturally expected to have a color close to each other, the difference data can be generally expressed by a relatively small number of bits. Thus, a data amount of the difference data is generally smaller than that of the values for the second image. Moreover, the difference data generally shows a statistical bias with a center at zero, so it is preferable that the difference data be entropy-coded and thereafter stored in the corresponding point file. Thereby, a further increase in data compression is obtained.

Another embodiment of the present invention relates to an image interpolation method. This method includes: acquiring a corresponding point file which describes a matching result of a first image and a second image, wherein the corresponding point file includes positional information on points which correspond between the first image and the second image and difference data of attribute values of points which correspond between the first image and the second image; and generating an image or intermediate image based on the first image and the second image by performing interpolation based on the first image and the corresponding point file. In other words, the second image does not need to be referred to at a stage of generating the intermediate image. Here, it is understood that what is meant by the "first image" being utilized is that a representative of either of the "actual" first image and the second image may be utilized. Thus, only one of the images suffices. The interpolation may be computed using any interpolation method, including linear or nonlinear.

Still another embodiment relates to an image interpolation apparatus which includes: an image input unit which acquires a first image and a second image; and a matching processor which computes a matching between the first image and the second image thus acquired and which generates a corresponding point file by detecting points that correspond between the images, wherein, the corresponding point file includes positional information on the points that correspond between the images and difference data of pixel values on the points that correspond between the images.

The matching processor may detect points on the second image that correspond to lattice points of a mesh provided on the first image, and based on a thus detected result a destination polygon corresponding to the second image may be defined on a source polygon that constitutes the mesh on the first image.

The matching processor may perform a pixel-by-pixel matching computation based on correspondence between a critical point detected through a two-dimensional search on the first image and a critical point detected through a two-dimensional search on the second image. The matching processor may multiresolutinalize the first image and the second image by respectively extracting the critical points, then may perform a pixel-by-pixel matching computation between same multiresolution levels, and may acquire a pixel-by-pixel correspondence relation at a most fine level of resolution at a final stage while inheriting a result of the pixel-by-pixel matching computation to a matching computation in a different multiresolution level.

Here, the matching method utilizing the critical points is an application of the premised technology. However, the premised technology does not touch on the features of the embodiments of the present invention relating to the lattice points or the polygons determined thereby. Introduction of somewhat simplified techniques such as the use of polygons and difference data makes a significant reduction of the size of the corresponding point file possible.

With respect to the use of polygons, in a case where the first and second images have n×m pixels respectively, there are (n×m)² combinations if pixel-by-pixel correspondence is used, and the size of the corresponding point file will become quite large. However, instead, this correspondence may be modified by describing the correspondence relation between the lattice points or, substantially equivalently, the correspondence relation between polygons determined by the lattice points, so that the data amount may be reduced. Thereafter, the first or second image and the small-sized corresponding point file can be used for interpolation, such as reproduction of motion pictures, thereby improving transmission, storage and so forth of motion pictures.

Still another embodiment of the present invention relates also to an image interpolation apparatus that includes: a communication unit that acquires a corresponding point file which describes a matching result of a first image and a second image, wherein the corresponding point file includes positional information on points which correspond between the first image and the second image and difference data of attribute values of points which correspond between the first image and the second image; and an intermediate image generator which generates an intermediate image of the first image and the second image by performing interpolation based on the first image and the corresponding point file.

Moreover, the image interpolation apparatus may further include a display unit which displays at least the intermediate image. The apparatus may further include a corresponding point file storage unit which records or stores the corresponding point file in a manner such that the corresponding point file is associated with the first image. The intermediate image generator may generate the intermediate image by moving a point within the first image according to the positional information, and varying the attribute value of the point based on the difference data.

Still another embodiment relates also to an image interpolation method that includes: acquiring, a matching result computed between a first image and a second image; and generating an intermediate image of the first image and second image without referring to the second image, by acting upon the first image based on the matching result and thus varying a position and a value of pixels included in the first image.

It is to be noted that the premised technology is not a prerequisite in the present invention. Moreover, it is also possible to have replacement or substitution of the above-described structural components and elements of methods in part or whole as between method and apparatus or to add elements to either method or apparatus. Also, the methods may be implemented by a computer program and saved on a recording medium or the like and are all effective as and encompassed by the present invention.

Moreover, this summary of the invention does features that may not be necessary features such that an embodiment of the present invention may also be a sub-combination of these described features.

BRIEF DESCRIPTION OF THE DRAWINGS

FIG. 1a is an image obtained as a result of the application of an averaging filter to a human facial image.

FIG. 1b is an image obtained as a result of the application of an averaging filter to another human facial image.

FIG. 1c is an image of a human face at $p^{(5,0)}$ obtained in a preferred embodiment in the premised technology.

FIG. 1d is another image of a human face at $p^{(5,0)}$ obtained in a preferred embodiment in the premised technology.

FIG. 1e is an image of a human face at $p^{(5,1)}$ obtained in a preferred embodiment in the premised technology.

FIG. 1f is another image of a human face at $p^{(5,1)}$ obtained in a preferred embodiment in the premised technology.

FIG. 1g is an image of a human face at $p^{(5,2)}$ obtained in a preferred embodiment in the premised technology.

FIG. 1h is another image of a human face at $p^{(5,2)}$ obtained in a preferred embodiment in the premised technology.

FIG. 1i is an image of a human face at $p^{(5,3)}$ obtained in a preferred embodiment in the premised technology.

FIG. 1j is another image of a human face at $p^{(5,3)}$ obtained in a preferred embodiment in the premised technology.

FIG. 2R shows an original quadrilateral.

FIG. 2A shows an inherited quadrilateral.

FIG. 2B shows an inherited quadrilateral.

FIG. 2C shows an inherited quadrilateral.

FIG. 2D shows an inherited quadrilateral.

FIG. 2E shows an inherited quadrilateral.

FIG. 9 is a diagram showing correspondence between partial images of the m-th and (m−1)th levels of resolution.

DETAILED DESCRIPTION OF THE INVENTION

Figure 3:
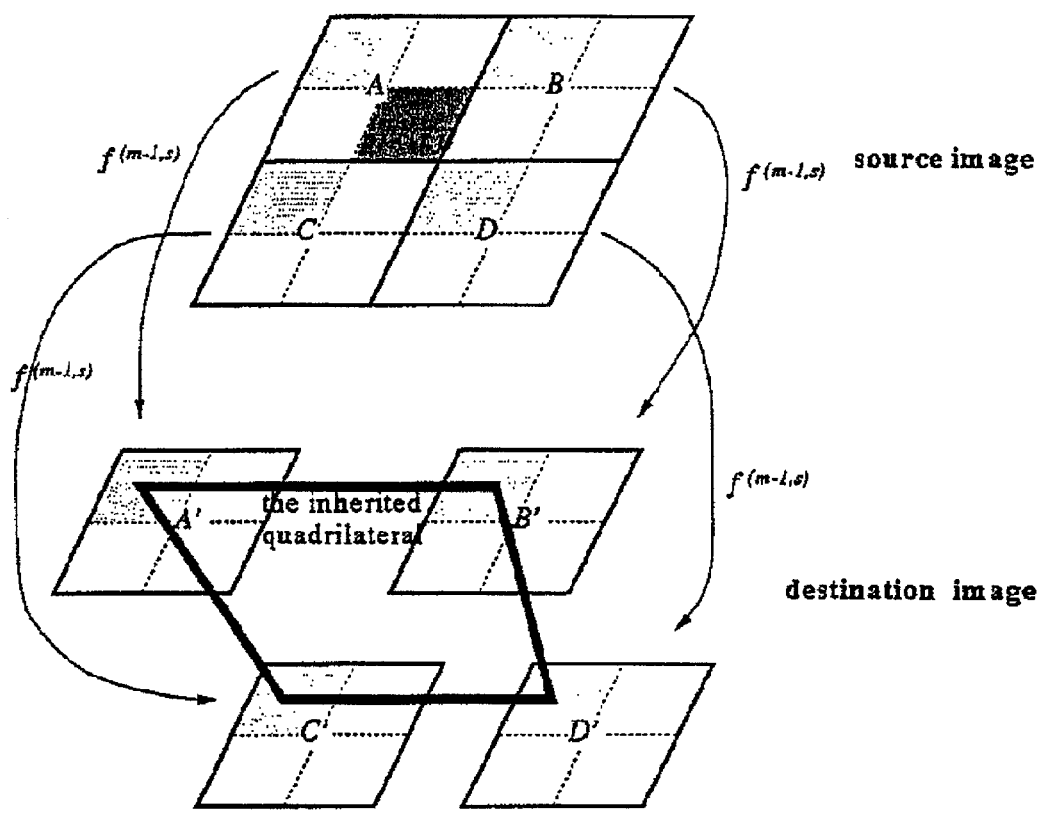
FIG. 3 is a diagram showing the relationship between a source image and a destination image and that between the m-th level and the (m−1)th level, using a quadrilateral.

The invention will now be described based on the preferred embodiments, which do not intend to limit the scope of the present invention, but exemplify the invention. All of the features and the combinations thereof described in the embodiment are not necessarily essential to the invention.

First, the multiresolutional critical point filter technology and the image matching processing using the technology, both of which will be utilized in the preferred embodiments, will be described in detail as "Premised Technology". Namely, the following sections [1] and [2] (below) belong to the premised technology, where [1] describes elemental techniques and [2] describes a processing procedure. These techniques are patented under Japanese Patent No. 2927350 and owned by the same inventors of the present invention. As described in more detail below following the discussion of the premised technology, according to the embodiments of the present invention there is provided a mesh on an image, so that lattice points of the mesh represent a plurality of pixels of the image. Thus, even though application efficiency for a pixel-by-pixel matching technique as described in the premised technology is naturally high, it is to be noted that the image matching techniques provided in the present embodiments are not limited to the same levels. In particular, in FIGS. 18 to 23, image interpolation techniques using embodiments of the present invention and utilizing the premised technology will be described in a specific manner.

Premised Technology

[1] Detailed Description of Elemental Techniques

[1.1] Introduction

Using a set of new multiresolutional filters called critical point filters, image matching is accurately computed. There is no need for any prior knowledge concerning the content of the images or objects in question. The matching of the images is computed at each resolution while proceeding through the resolution hierarchy. The resolution hierarchy proceeds from a coarse level to a fine level. Parameters necessary for the computation are set completely automatically by dynamical computation analogous to human visual systems. Thus, There is no need to manually specify the correspondence of points between the images.

The premised technology can be applied to, for instance, completely automated morphing, object recognition, stereo photogrammetry, volume rendering, and smooth generation of motion images from a small number of frames. When applied to morphing, given images can be automatically transformed. When applied to volume rendering, intermediate images between cross sections can be accurately reconstructed, even when a distance between cross sections is rather large and the cross sections vary widely in shape.

[1.2] The hierarchy of the critical point filters

The multiresolutional filters according to the premised technology preserve the intensity and location of each critical point included in the images while reducing the resolution. Initially, let the width of an image to be examined be N and the height of the image be M. For simplicity, assume that $N=M=2^n$ where n is a positive integer. An interval $[0, N] \subset R$ is denoted by I. A pixel of the image at position (i, j) is denoted by $p^{(i,j)}$ where i, $j \in I$.

Here, a multiresolutional hierarchy is introduced. Hierarchized image groups are produced by a multiresolutional filter. The multiresolutional filter carries out a two dimensional search on an original image and detects critical points therefrom. The multiresolutional filter then extracts the critical points from the original image to construct another image having a lower resolution. Here, the size of each of the respective images of the m-th level is denoted as $2^m \times 2^m$ (0<m<n). A critical point filter constructs the following four new hierarchical images recursively, in the direction descending from n.

$$p_{(i,j)}^{(m,0)} = \min(\min(p_{(2i,2j)}^{(m+1,0)}, p_{(2i,2j+1)}^{(m+1,0)}), \min(p_{(2i+1,2j)}^{(m+1,0)}, p_{(2i+1,2j+1)}^{(m+1,0)}))$$

$$p_{(i,j)}^{(m,1)} = \max(\min(p_{(2i,2j)}^{(m+1,1)}, p_{(2i,2j+1)}^{(m+1,1)}), \min(p_{(2i+1,2j)}^{(m+1,1)}, p_{(2i+1,2j+1)}^{(m+1,1)}))$$

$$p_{(i,j)}^{(m,2)} = \min(\max(p_{(2i,2j)}^{(m+1,2)}, p_{(2i,2j+1)}^{(m+1,2)}), \max(p_{(2i+1,2j)}^{(m+1,2)}, p_{(2i+1,2j+1)}^{(m+1,2)}))$$

$$p_{(i,j)}^{(m,3)} = \max(\max(p_{(2i,2j)}^{(m+1,3)}, p_{(2i,2j+1)}^{(m+1,3)}), \max(p_{(2i+1,2j)}^{(m+1,3)}, p_{(2i+1,2j+1)}^{(m+1,3)})) \quad (1)$$

where we let $$p_{(i,j)}^{(n,0)} = p_{(i,j)}^{(n,1)} = p_{(i,j)}^{(n,2)} = p_{(i,j)}^{(n,3)} = p_{(i,j)} \quad (2)$$

The above four images are referred to as subimages hereinafter. When $\min_{x \leq t \leq x+1}$ and $\max_{x < t < x+1}$ are abbreviated to $\alpha$ and $\beta$, respectively, the subimages can be expressed as follows:

$$p^{(m,0)} = \alpha(x)\alpha(y)p^{(m+1,0)}$$

$$p^{(m,1)} = \alpha(x)\beta(y)p^{(m+1,1)}$$

$$p^{(m,2)} = \beta(x)\alpha(y)p^{(m+1,2)}$$

$$p^{(m,3)} = \beta(x)\alpha(y)p^{(m+1,3)}$$

Namely, they can be considered analogous to the tensor products of $\alpha$ and $\beta$. The subimages correspond to the respective critical points. As is apparent from the above equations, the critical point filter detects a critical point of the original image for every block consisting of 2×2 pixels. In this detection, a point having a maximum pixel value and a point having a minimum pixel value are searched with respect to two directions, namely, vertical and horizontal directions, in each block. Although pixel intensity is used as a pixel value in this premised technology, various other values relating to the image may be used. A pixel having the maximum pixel values for the two directions, one having minimum pixel values for the two directions, and one having a minimum pixel value for one direction and a maximum pixel value for the other direction are detected as a local maximum point, a local minimum point, and a saddle point, respectively.

By using the critical point filter, an image (1 pixel here) of a critical point detected inside each of the respective blocks serves to represent its block image (4 pixels here) in the next lower resolution level. Thus, the resolution of the image is reduced. From a singularity theoretical point of view, $\alpha(x)\alpha(y)$ preserves the local minimum point (minima point), $\beta(x)\beta(y)$ preserves the local maximum point (maxima point), $\alpha(x)\beta(y)$ and $\beta(x)\alpha(y)$ preserve the saddle points.

At the beginning, a critical point filtering process is applied separately to a source image and a destination image which are to be matching-computed. Thus, a series of image groups, namely, source hierarchical images and destination hierarchical images are generated. Four source hierarchical images and four destination hierarchical images are generated corresponding to the types of the critical points.

Thereafter, the source hierarchical images and the destination hierarchical images are matched in a series of resolution levels. First, the minima points are matched using $p^{(m,0)}$. Next, the first saddle points are matched using $p^{(m,1)}$ based on the previous matching result for the minima points. The second saddle points are matched using $p^{(m,2)}$. Finally, the maxima points are matched using $p^{(m,3)}$.

FIGS. 1c and 1d show the subimages $p^{(5,0)}$ of the images in FIGS. 1a and 1b, respectively. Similarly, FIGS. 1e and 1f show the subimages $p^{(5,1)}$, FIGS. 1g and 1h show the subimages $p^{(5,2)}$, and FIGS. 1i and 1j show the subimages $p^{(5,3)}$. Characteristic parts in the images can be easily matched using subimages. The eyes can be matched by $p^{(5,0)}$ since the eyes are the minima points of pixel intensity in a face. The mouths can be matched by $p^{(5,1)}$ since the mouths have low intensity in the horizontal direction. Vertical lines on both sides of the necks become clear by $p^{(5,2)}$. The ears and bright parts of the cheeks become clear by $p^{(5,3)}$ since these are the maxima points of pixel intensity.

As described above, the characteristics of an image can be extracted by the critical point filter. Thus, by comparing, for example, the characteristics of an image shot by a camera with the characteristics of several objects recorded in advance, an object shot by the camera can be identified.

[1.3] Computation of Mapping Between Images

Now, for matching images, a pixel of the source image at the location (i,j) is denoted by $p_{(i,j)}^{(n)}$ and that of the destination image at (k,l) is denoted by $q_{(k,l)}^{(n)}$ where i, j, k, l $\in$ I. The energy of the mapping between the images (described later in more detail) is then defined. This energy is determined by the difference in the intensity of the pixel of the source image and its corresponding pixel of the destination image and the smoothness of the mapping. First, the mapping $f^{(m,0)}: p^{(m,0)} \to q^{(m,0)}$ between $p^{(m,0)}$ and $q^{(m,0)}$ with the minimum energy is computed. Based on $f^{(m,0)}$, the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,i)}$ (i=0, 1, 2, ... ) is referred to as a submapping. The order of i will be rearranged as shown in the following equation (3) in computing $f^{(m,i)}$ for reasons to be described later.

$$f^{(m,i)}: p^{(m,\sigma(i))} \to q^{(m,\sigma(i))} \quad (3)$$

where $\sigma(i) \in \{0, 2, 3\}$.

[1.3.1] Bijectivity

When the matching between a source image and a destination image is expressed by means of a mapping, that mapping shall satisfy the Bijectivity Conditions (BC) between the two images (note that a one-to-one surjective mapping is called a bijection). This is because the respective images should be connected satisfying both surjection and injection, and there is no conceptual supremacy existing between these images. It is to be noted that the mappings to be constructed here are the digital version of the bijection. In the premised technology, a pixel is specified by a coordinate point.

The mapping of the source subimage (a subimage of a source image) to the destination subimage (a subimage of a destination image) is represented by $f^{(m,s)}: I/2^{n-m} \times I/2^{n-m} \to I/2^{n-m} \times I/2^{n-m}$ (s=0, 1, ... ), where $f_{(i,j)}^{(m,s)}=(k,l)$ means that $p_{(i,j)}^{(m,s)}$ of the source image is mapped to $q_{(k,l)}^{(m,s)}$ of the destination image. For simplicity, when f(i,j)=(k,l) holds, a pixel $q_{(k,l)}$ is denoted by $q_{f(i,j)}$.

When the data sets are discrete as image pixels (grid points) treated in the premised technology, the definition of bijectivity is important. Here, the bijection will be defined in the following manner, where i, j, k and l are all integers. First, a square region R defined on the source image plane is considered $$p_{(i,j)}^{(m,s)} p_{(i+1,j)}^{(m,s)} p_{(i+1,j+1)}^{(m,s)} p_{(i,j+1)}^{(m,s)} \quad (4)$$

where i=0, ... , $2^m$−1, and j=0, ... , $2^m$−1. The edges of R are directed as follows:

$$\overline{p_{(i,j)}^{(m,s)} p_{(i+1,j)}^{(m,s)}}, \overline{p_{(i+1,j)}^{(m,s)} p_{(i+1,j+1)}^{(m,s)}},$$
$$\overline{p_{(i+1,j+1)}^{(m,s)} p_{(i,j+1)}^{(m,s)}} \text{ and } \overline{p_{(i,j+1)}^{(m,s)} p_{(i,j)}^{(m,s)}} \quad (5)$$

This square region R will be mapped by f to a quadrilateral on the destination image plane:

$$q_{f(i,j)}^{(m,s)} q_{f(i+1,j)}^{(m,s)} q_{f(i+1,j+1)}^{(m,s)} q_{f(i,j+1)}^{(m,s)} \quad (6)$$

This mapping $f^{(m,s)}$ (R), that is, $$f^{(m,s)}(R)=f^{(m,s)}(p_{(i,j)}^{(m,s)} p_{(i+1,j)}^{(m,s)} p_{(i+1,j+1)}^{(m,s)} p_{(i,j+1)}^{(m,s)})=q_{f(i,j)}^{(m,s)} q_{f(i+1,j)}^{(m,s)} q_{f(i+1,j+1)}^{(m,s)} q_{f(i,j+1)}^{(m,s)}$$

should satisfy the following bijectivity conditions(referred to as BC hereinafter):

1. The edges of the quadrilateral $f^{(m,s)}$ (R) should not intersect one another.
2. The orientation of the edges of $f^{(m,s)}$ (R) should be the same as that of R (clockwise in the case shown in FIG. 2, described below).
3. As a relaxed condition, a retraction mapping is allowed.

Without a certain type of a relaxed condition as in, for example, condition 3 above, there would be no mappings which completely satisfy the BC other than a trivial identity mapping. Here, the length of a single edge of $f^{(m,s)}(R)$ may be zero. Namely, $f^{(m,s)}(R)$ may be a triangle. However, $f^{(m,s)}(R)$ is not allowed to be a point or a line segment having area zero. Specifically speaking, if FIG. 2R is the original quadrilateral, FIGS. 2A and 2D satisfy the BC while FIGS. 2B, 2C and 2E do not satisfy the BC.

In actual implementation, the following condition may be further imposed to easily guarantee that the mapping is surjective. Namely, each pixel on the boundary of the source image is mapped to the pixel that occupies the same location at the destination image. In other words, $f(i,j)=(i,j)$ (on the four lines of $i=0$, $i=2^m-1$, $j=0$, $j=2^m-1$). This condition will be hereinafter referred to as an additional condition.

[1. 3. 2] Energy of Mapping

[1. 3. 2. 1] Cost Related to the Pixel Intensity

The energy of the mapping f is defined. An objective here is to search a mapping whose energy becomes minimum. The energy is determined mainly by the difference in the intensity between the pixel of the source image and its corresponding pixel of the destination image. Namely, the energy $C_{(i,j)}^{(m,s)}$ of the mapping $f^{(m,s)}$ at $(i,j)$ is determined by the following equation (7).

$$C_{(i,j)}^{(m,s)}=|V(p_{(i,j)}^{(m,s)})-V(q_{f(i,j)}^{(m,s)})|^2 \qquad (7)$$

where $V(p_{i,j}^{(m,s)})$ and $V(q_{f(i,j)}^{(m,s)})$ are the intensity values of the pixels $p_{(i,j)}^{(m,s)}$ and $q_{f(i,j)}^{(m,s)}$, respectively. The total energy $C^{(m,s)}$ of f is a matching evaluation equation, and can be defined as the sum of $C_{(i,j)}^{(m,s)}$ as shown in the following equation (8).

$$C_f^{(m,s)} = \sum_{i=0}^{i=2^m-1} \sum_{j=0}^{j=2^m-1} C_{(i,j)}^{(m,s)} \qquad (8)$$

[1. 3. 2. 2] Cost Related to the Locations of the Pixel for Smooth Mapping

In order to obtain smooth mappings, another energy $D_f$ for the mapping is introduced. The energy $D_f$ is determined by the locations of $p_{(i,j)}^{(m,s)}$ and $q_{f(i,j)}^{(m,s)}$ ($i=0, 1, \ldots, 2^m-1$, $j=0, 1, \ldots, 2^m-1$), regardless of the intensity of the pixels. The energy $D_{(i,j)}^{(m,s)}$ of the mapping $f^{(m,s)}$ at a point $(i,j)$ is determined by the following equation (9).

$$D_{(i,j)}^{(m,s)}=\eta E_{0(i,j)}^{(m,s)}+E_{1(i,j)}^{(m,s)} \qquad (9)$$

where the coefficient parameter $\eta$ which is equal to or greater than 0 is a real number. And we have $$E_{0(i,j)}^{(m,s)}=\|(i,j)-f^{(m,s)}(i,j)\|^2 \qquad (10)$$

$$E_{1(i,j)}^{(m,s)} = \sum_{i'=i-1}^{i} \sum_{j'=j-1}^{j} \|(f^{(m,s)}(i,j)-(i,j))-(f^{(m,s)}(i',j')-(i',j'))\|^2/4 \qquad (11)$$

where $$\|(x,y)\|=\sqrt{x^2+y^2} \qquad (12),$$

i' and j' are integers and f(i',j') is defined to be zero for i'<0 and j'<0. $E_0$ is determined by the distance between $(i,j)$ and $f(i,j)$. $E_0$ prevents a pixel from being mapped to a pixel too far away from it. However, as explained below, $E_0$ can be replaced by another energy function. $E_1$ ensures the smoothness of the mapping. $E_1$ represents a distance between the displacement of $p(i,j)$ and the displacement of its neighboring points. Based on the above consideration, another evaluation equation for evaluating the matching, or the energy $D_f$ is determined by the following equation:

$$D_f^{(m,s)} = \sum_{i=0}^{i=2^m-1} \sum_{j=0}^{j=2^m-1} D_{(i,j)}^{(m,s)} \qquad (13)$$

[1. 3. 2. 3] Total Energy of the Mapping

The total energy of the mapping, that is, a combined evaluation equation which relates to the combination of a plurality of evaluations, is defined as $\lambda C_f^{(m,s)}+D_f^{(m,s)}$ where $\lambda \geq 0$ is a real number. The goal is to detect a state in which the combined evaluation equation has an extreme value, namely, to find a mapping which gives the minimum energy expressed by the following:

$$\min_f \{\lambda C_f^{(m,s)}+D_f^{(m,s)}\} \qquad (14)$$

Care must be exercised in that the mapping becomes an identity mapping if $\lambda=0$ and $\eta=0$ (i. e., $f^{(m,s)}(i,j)=(i,j)$ for all $i=0, 1, \ldots, 2^m-1$ and $j=0, 1, \ldots, 2^m-1$). As will be described later, the mapping can be gradually modified or transformed from an identity mapping since the case of $\lambda=0$ and $\eta=0$ is evaluated at the outset in the premised technology. If the combined evaluation equation is defined as $C_f^{(m,s)}+\lambda D_f^{(m,s)}$ where the original position of $\lambda$ is changed as such, the equation with $\lambda=0$ and $\eta=0$ will be $C_f^{(m,s)}$ only. As a result thereof, pixels would randomly matched to each other only because their pixel intensities are close, thus making the mapping totally meaningless. Transforming the mapping based on such a meaningless mapping makes no sense. Thus, the coefficient parameter is so determined that the identity mapping is initially selected for the evaluation as the best mapping.

Similar to this premised technology, differences in the pixel intensity and smoothness are considered in a technique called "optical flow" that is known in the art. However, the optical flow technique cannot be used for image transformation since the optical flow technique takes into account only the local movement of an object. However, global correspondence can also be detected by utilizing the critical point filter according to the premised technology.

[1. 3. 3] Determining the Mapping with Multiresolution

A mapping $f_{min}$ which gives the minimum energy and satisfies the BC is searched by using the multiresolution hierarchy. The mapping between the source subimage and the destination subimage at each level of the resolution is computed. Starting from the top of the resolution hierarchy (i.e., the coarsest level), the mapping is determined at each resolution level, and where possible, mappings at other levels are considered. The number of candidate mappings at each level is restricted by using the mappings at an upper (i.e., coarser) level of the hierarchy. More specifically speaking, in the course of determining a mapping at a certain level, the mapping obtained at the coarser level by one is imposed as a sort of constraint condition.

We thus define a parent and child relationship between resolution levels. When the following equation (15) holds, $$(i', j') = \left(\left\lfloor \frac{i}{2} \right\rfloor, \left\lfloor \frac{j}{2} \right\rfloor\right), \quad (15)$$

where $\lfloor x \rfloor$ denotes the largest integer not exceeding x, $p_{(i',j')}^{(m-1,s)}$ and $q_{(i',j')}^{(m-1,s)}$ are respectively called the parents of $p_{(i,j)}^{(m,s)}$ and $q_{(i,j)}^{(m,s)}$. Conversely, $p_{(i,j)}^{(m,s)}$ and $q_{(i,j)}^{(m,s)}$ are the child of $p_{(i',j')}^{(m-1,s)}$ and the child of $q_{(i',j')}^{(m-1,s)}$, respectively. A function parent (i,j) is defined by the following equation (16):

$$\text{parent}(i, j) = \left(\left\lfloor \frac{i}{2} \right\rfloor, \left\lfloor \frac{j}{2} \right\rfloor\right) \quad (16)$$

Now, a mapping between $p_{(i,j)}^{(m,s)}$ and $q_{(k,l)}^{(m,s)}$ is determined by computing the energy and finding the minimum thereof. The value of $f^{(m,s)}$ (i,j)=(k,l) is determined as follows using f(m−1,s) (m=1, 2, . . . ,n). First of all, a condition is imposed that $q_{(k,l)}^{(m,s)}$ should lie inside a quadrilateral defined by the following definitions (17) and (18). Then, the applicable mappings are narrowed down by selecting ones that are thought to be reasonable or natural among them satisfying the BC.

$$q_{g^{(m,s)}(i-1,j-1)}^{(m,s)} q_{g^{(m,s)}(i-1,j+1)}^{(m,s)} q_{g^{(m,s)}(i+1,j+1)}^{(m,s)} q_{g^{(m,s)}(i+1,j-1)}^{(m,s)} \quad (17)$$

where $$g^{(m,s)}(i,j) = f^{(m-1,s)}(\text{parent}(i,j)) + f^{(m-1,s)}(\text{parent}(i,j)+(1,1)) \quad (18)$$

The quadrilateral defined above is hereinafter referred to as the inherited quadrilateral of $p_{(i,j)}^{(m,s)}$. The pixel minimizing the energy is sought and obtained inside the inherited quadrilateral.

FIG. 3 illustrates the above-described procedures. The pixels A, B, C and D of the source image are mapped to A', B', C' and D' of the destination image, respectively, at the (m−1)th level in the hierarchy. The pixel $p_{(i,j)}^{(m,s)}$ should be mapped to the pixel $q_{f^{(m)}(i,j)}^{(m,s)}$ which exists inside the inherited quadrilateral A' B' C' D'. Thereby, bridging from the mapping at the (m−1)th level to the mapping at the m-th level is achieved.

The energy $E_0$ defined above may now be replaced by the following equations (19) and (20):

$$E_{0(i,j)} = \|f^{(m,0)}(i,j) - g^{(m)}(i,j)\|^2 \quad (19)$$

$$E_{0(i,j)} = \|f^{(m,s)}(i,j) - f^{(m,s-1)}(i,j)\|^2, (1 \leq i) \quad (20)$$

for computing the submapping $f^{(m,0)}$ and the submapping $f^{(m,s)}$ at the m-th level, respectively.

In this manner, a mapping which maintains a low energy of all the submappings is obtained. Using the equation (20) makes the submappings corresponding to the different critical points associated to each other within the same level in order that the subimages can have high similarity. The equation (19) represents the distance between $f^{(m,s)}$ (i,j) and the location where (i,j) should be mapped when regarded as a part of a pixel at the (m−1)the level.

When there is no pixel satisfying the BC inside the inherited quadrilateral A' B' C' D', the following steps are taken. First, pixels whose distance from the boundary of A' B' C' D' is L (at first, L=1) are examined. If a pixel whose energy is the minimum among them satisfies the BC, then this pixel will be selected as a value of $f^{(m,s)}$ (i,j). L is increased until such a pixel is found or L reaches its upper bound $L_{max}^{(m)}$. $L_{max}^{(m)}$ is fixed for each level m. If no pixel is found at all, the third condition of the BC is ignored temporarily and such mappings that caused the area of the transformed quadrilateral to become zero (a point or a line) will be permitted so as to determine $f^{(m,s)}$ (i,j). If such a pixel is still not found, then the first and the second conditions of the BC will be removed.

Multiresolution approximation is essential to determining the global correspondence of the images while preventing the mapping from being affected by small details of the images. Without the multiresolution approximation, it is impossible to detect a correspondence between pixels whose distances are large. In the case where the multiresolution approximation is not available, the size of an image will generally be limited to a very small size, and only tiny changes in the images can be handled. Moreover, imposing smoothness on the mapping usually makes it difficult to find the correspondence of such pixels. That is because the energy of the mapping from one pixel to another pixel which is far therefrom is high. On the other hand, the multiresolution approximation enables finding the approximate correspondence of such pixels. This is because the distance between the pixels is small at the upper (coarser) level of the hierarchy of the resolution.

[1. 4] Automatic Determination of the Optimal Parameter Values

One of the main deficiencies of the existing image matching techniques lies in the difficulty of parameter adjustment. In most cases, the parameter adjustment is performed manually and it is extremely difficult to select the optimal value. However, according to the premised technology, the optimal parameter values can be obtained completely automatically.

The systems according to this premised technology include two parameters, namely, λ and η, where λ and η represent the weight of the difference of the pixel intensity and the stiffness of the mapping, respectively. In order to automatically determine these parameters, the are initially set to 0. First, λ is gradually increased from λ=0 while η is fixed at 0. As λ becomes larger and the value of the combined evaluation equation (equation (14)) is minimized, the value of $C_f^{(m,s)}$ for each submapping generally becomes smaller. This basically means that the two images are matched better. However, if λ exceeds the optimal value, the following phenomena occur:

1. Pixels which should not be corresponded are erroneously corresponded only because their intensities are close.
2. As a result, correspondence between images becomes inaccurate, and the mapping becomes invalid.
3. As a result, $D_f^{(m,s)}$ in equation (14) tends to increase abruptly.
4. As a result, since the value of equation (14) tends to increase abruptly, $f^{(m,s)}$ changes in order to suppress the abrupt increase of $D_f^{(m,s)}$. As a result, $C_f^{(m,s)}$ increases.

Therefore, a threshold value at which $C_f^{(m,s)}$ turns to an increase from a decrease is detected while a state in which equation (14) takes the minimum value with λ being increased is kept. Such λ is determined as the optimal value at η=0. Next, the behavior of $C_f^{(m,s)}$ is examined while η is increased gradually, and η will be automatically determined by a method described later. λ will then again be determined corresponding to such an automatically determined η.

The above-described method resembles the focusing mechanism of human visual systems. In the human visual systems, the images of the respective right eye and left eye are matched while moving one eye. When the objects are clearly recognized, the moving eye is fixed.

[1. 4. 1] Dynamic Determination of $\lambda$

Initially, $\lambda$ is increased from 0 at a certain interval, and a subimage is evaluated each time the value of $\lambda$ changes. As shown in equation (14), the total energy is defined by $\lambda C_f^{(m,s)} + D_f^{(m,s)}$ in equation (9) represents the smoothness and theoretically becomes minimum when it is the identity mapping. $E_0$ and $E_1$ increase as the mapping is further distorted. Since $E_1$ is an integer, 1 is the smallest step of $D_f^{(m,s)}$. Thus, it is impossible to change the mapping to reduce the total energy unless a changed amount (reduction amount) of the current $\lambda C_{(i,j)}^{(m,s)}$ is equal to or greater than 1. Since $D_f^{(m,s)}$ increases by more than 1 accompanied by the change of the mapping, the total energy is not reduced unless $\lambda C_{(i,j)}^{(m,s)}$ is reduced by more than 1.

Under this condition, it is shown that $C_{(i,j)}^{(m,s)}$ decreases in normal cases as $\lambda$ increases. The histogram of $C_{(i,j)}^{(m,s)}$ is denoted as h(l), where h(l) is the number of pixels whose energy $C_{(i,j)}^{(m,s)}$ is $l^2$. In order that $\lambda l^2 \leq 1$, for example, the case of $l^2 = 1/\lambda$ is considered. When $\lambda$ varies from $\lambda_1$ to $\lambda_2$, a number of pixels (denoted A) expressed by the following equation (21):

$$A = \sum_{l=\lceil \frac{1}{\lambda_2} \rceil}^{\lfloor \frac{1}{\lambda_1} \rfloor} h(l) \cong \int_{l=\frac{1}{\lambda_2}}^{\frac{1}{\lambda_1}} h(l)\,dl = -\int_{\lambda_2}^{\lambda_1} h(l) \frac{1}{\lambda^{3/2}}\,d\lambda = \int_{\lambda_1}^{\lambda_2} \frac{h(l)}{\lambda^{3/2}}\,d\lambda \quad (21)$$

changes to a more stable state having the energy shown in equation (22):

$$C_f^{(m,s)} - l^2 = C_f^{(m,s)} - \frac{1}{\lambda}. \quad (22)$$

Here, it is assumed that the energy of these pixels is approximated to be zero. This means that the value of $C^{(i,j)(m,s)}$ changes by:

$$\partial C_f^{(m,s)} = -\frac{A}{\lambda} \quad (23)$$

As a result, equation (24) holds.

$$\frac{\partial C_f^{(m,s)}}{\partial \lambda} = -\frac{h(l)}{\lambda^{5/2}} \quad (24)$$

Since h(l)>0, $C_f^{(m,s)}$ decreases in the normal case. However, when $\lambda$ exceeds the optimal value, the above phenomenon, that is, an increase in $C_f^{(m,s)}$ occurs. The optimal value of $\lambda$ is determined by detecting this phenomenon.

When $$h(l) = Hl^k = \frac{H}{\lambda^{k/2}} \quad (25)$$

is assumed, where both H(H>0) and k are constants, the equation (26) holds:

$$\frac{\partial C_f^{(m,s)}}{\partial \lambda} = -\frac{H}{\lambda^{5/2+k/2}} \quad (26)$$

Then, if $k \neq -3$, the following equation (27) holds:

$$C_f^{(m,s)} = C + \frac{H}{(3/2+k/2)\lambda^{3/2+k/2}} \quad (27)$$

The equation (27) is a general equation of $C_f^{(m,s)}$ (where C is a constant).

When detecting the optimal value of $\lambda$, the number of pixels violating the BC may be examined for safety. In the course of determining a mapping for each pixel, the probability of violating the BC is assumed as a value $p_0$ here. In this case, since $$\frac{\partial A}{\partial \lambda} = \frac{h(l)}{\lambda^{3/2}} \quad (28)$$

holds, the number of pixels violating the BC increases at a rate of:

$$B_0 = \frac{h(l)p_0}{\lambda^{3/2}} \quad (29)$$

Thus, $$\frac{B_0 \lambda^{3/2}}{p_0 h(l)} = 1 \quad (30)$$

is a constant. If it is assumed that $h(l) = Hl^k$, the following equation (31), for example, $$B_0 \lambda^{3/2+k/2} = p_0 H \quad (31)$$

becomes a constant. However, when $\lambda$ exceeds the optimal value, the above value of equation (31) increases abruptly. By detecting this phenomenon, i.e. whether or not the value of $B_0 \lambda^{3/2+k/2}/2^m$ exceeds an abnormal value $B_{0thres}$, the optimal value of $\lambda$ can be determined. Similarly, whether or not the value of $B_1 \lambda^{3/2+k/2}/2^m$ exceeds an abnormal value $B_{1thres}$ can be used to check for an increasing rate $B_1$ of pixels violating the third condition of the BC. The reason why the factor $2^m$ is introduced here will be described at a later stage. This system is not sensitive to the two threshold values $B_{0thres}$ and $B_{1thres}$. The two threshold values $B_{0thres}$ and $B_{1thres}$ can be used to detect excessive distortion of the mapping which may not be detected through observation of the energy $C_f^{(m,s)}$.

In the experimentation, when $\lambda$ exceeded 0.1 the computation of $f^{(m,s)}$ was stopped and the computation of $f^{(m,s+1)}$ was started. That is because the computation of submappings is affected by a difference of only 3 out of 255 levels in pixel intensity when $\lambda > 0.1$ and it is then difficult to obtain a correct result.

[1. 4. 2] Histogram h(l)

The examination of $C_f^{(m,s)}$ does not depend on the histogram h(l), however, the examination of the BC and its third condition may be affected by h(l). When $(\lambda, C_f^{(m,s)})$ is actually plotted, k is usually close to 1. In the experiment, k=1 is used, that is, $B_0\lambda^2$ and $B_1\lambda^2$ are examined. If the true value of k is less than 1, $B_0\lambda^2$ and $B_1\lambda^2$ are not constants and increase gradually by a factor of $\lambda^{(1-k)/2}$. If h(l) is a constant, the factor is, for example, $\lambda^{1/2}$. However, such a difference can be absorbed by setting the threshold $B_{0thres}$ appropriately.

Let us model the source image by a circular object, with its center at $(x_0, y_0)$ and its radius r, given by:

$$p(i, j) = \begin{cases} \frac{255}{r} c\left(\sqrt{(i-x_0)^2 + (j-y_0)^2}\right) & \ldots \left(\sqrt{(i-x_0)^2 + (j-y_0)^2} \leq r\right) \\ 0 & \ldots \text{(otherwise)} \end{cases} \quad (32)$$

and the destination image given by:

$$q(i, j) = \begin{cases} \frac{255}{r} c\left(\sqrt{(i-x_1)^2 + (j-y_1)^2}\right) & \ldots \left(\sqrt{(i-x_1)^2 + (j-y_1)^2} \leq r\right) \\ 0 & \ldots \text{(otherwise)} \end{cases} \quad (33)$$

with its center at $(x_1, y_1)$ and radius r. In the above, let c(x) have the form of $c(x)=x^k$. When the centers $(x_0, y_0)$ and $(x_1,y_1)$ are sufficiently far from each other, the histogram h(l) is then in the form:

$$h(l) \propto rl^k (k \neq 0) \quad (34)$$

When k=1, the images represent objects with clear boundaries embedded in the background. These objects become darker toward their centers and brighter toward their boundaries. When k=−1, the images represent objects with vague boundaries. These objects are brightest at their centers, and become darker toward their boundaries. Without much loss of generality, it suffices to state that objects in images are generally between these two types of objects. Thus, choosing k such that −1·k·1 can cover most cases and the equation (27) is generally a decreasing function for this range.

As can be observed from the above equation (34), attention must be directed to the fact that r is influenced by the resolution of the image, that is, r is proportional to $2^m$. This is the reason for the factor $2^m$ being introduced in the above section [1.4.1].

[1. 4. 3] Dynamic Determination of $\eta$

The parameter $\eta$ can also be automatically determined in a similar manner. Initially, $\eta$ is set to zero, and the final mapping $f^{(n)}$ and the energy $C_f^{(n)}$ at the finest resolution are computed. Then, after f is increased by a certain value $\Delta\eta$, the final mapping $f^{(n)}$ and the energy $C_f^{(m)}$ at the finest resolution are again computed. This process is repeated until the optimal value of $\eta$ is obtained. $\eta$ represents the stiffness of the mapping because it is a weight of the following equation (35):

$$E_{0_{(i,j)}}^{(m,s)} = \|f^{(m,s)}(i, j) - f^{(m,s-1)}(i, j)\|^2 \quad (35)$$

Figure 4:
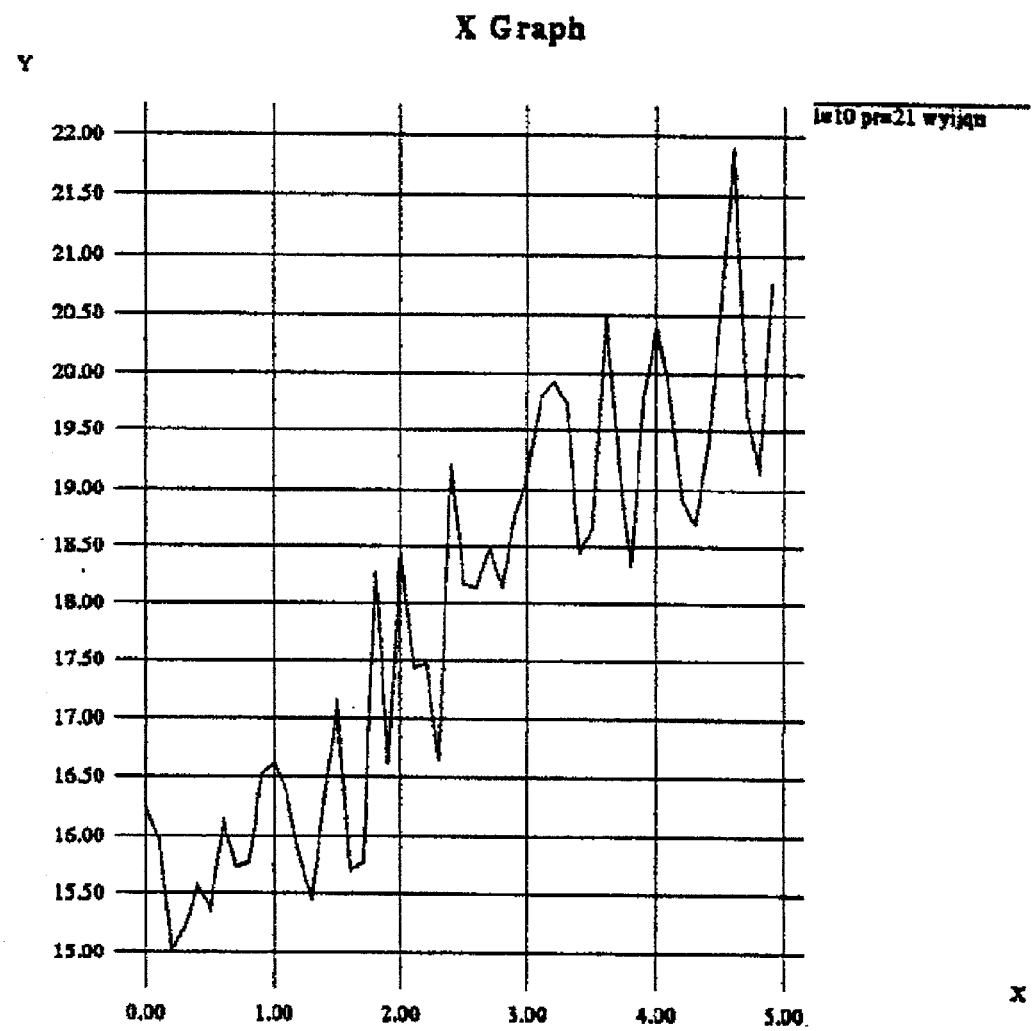
FIG. 4 shows the relationship between a parameter $\eta$ (represented by x-axis) and energy $C_f$ (represented by y-axis)

If $\eta$ is zero, $D_f^{(n)}$ is determined irrespective of the previous submapping, and the present submapping may be elastically deformed and become too distorted. On the other hand, if $\eta$ is a very large value, $D_f^{(n)}$ is almost completely determined by the immediately previous submapping. The submappings are then very stiff, and the pixels are mapped to almost the same locations. The resulting mapping is therefore the identity mapping. When the value of $\eta$ increases from 0, $C_f^{(n)}$ gradually decreases as will be described later. However, when the value of $\eta$ exceeds the optimal value, the energy starts increasing as shown in FIG. 4. In FIG. 4, the x-axis represents $\eta$, and y-axis represents $C_f$.

The optimum value of $\eta$ which minimizes $C_f^{(n)}$ can be obtained in this manner. However, since various elements affect this computation as compared to the case of $\lambda$, $C_f^{(n)}$ changes while slightly fluctuating. This difference is caused because a submapping is re-computed once in the case of $\lambda$ whenever an input changes slightly, whereas all the submappings must be re-computed in the case of $\eta$. Thus, whether the obtained value of $C_f^{(n)}$ is the minimum or not cannot be determined as easily. When candidates for the minimum value are found, the true minimum needs to be searched by setting up further finer intervals.

[1. 5] Supersampling

When deciding the correspondence between the pixels, the range of $f^{(m,s)}$ can be expanded to R×R (R being the set of real numbers) in order to increase the degree of freedom. In this case, the intensity of the pixels of the destination image is interpolated, to provide $f^{(m,s)}$ having an intensity at non-integer points:

$$V(q_{f^{(m,s)}(i,j)}^{(m,s)}) \quad (36)$$

That is, supersampling is performed. In an example implementation, $f^{(m,s)}$ may take integer and half integer values, and $$V(q_{(i,j)+(0.5,0.5)}^{(m,s)}) \quad (37)$$

is given by $$(V(q_{(i,j)}^{(m,s)})+V(q_{(i,j)+(1,1)}^{(m,2)}))/2 \quad (38)$$

[1. 6] Normalization of the Pixel Intensity of Each Image

When the source and destination images contain quite different objects, the raw pixel intensity may not be used to compute the mapping because a large difference in the pixel intensity causes excessively large energy $C_f^{(m,s)}$ and thus making it difficult to obtain an accurate evaluation.

For example, a matching between a human face and a cat's face is computed as shown in FIGS. 20(a) and 20(b). The cat's face is covered with hair and is a mixture of very bright pixels and very dark pixels. In this case, in order to compute the submappings of the two faces, subimages are normalized. That is, the darkest pixel intensity is set to 0 while the brightest pixel intensity is set to 255, and other pixel intensity values are obtained using linear interpolation.

[1. 7] Implementation

In an example implementation, a heuristic method is utilized wherein the computation proceeds linearly as the source image is scanned. First, the value of $f^{(m,s)}$ is determined at the top leftmost pixel (i,j)=(0,0). The value of each $f^{(m,s)}$ (i,j) is then determined while i is increased by one at each step. When i reaches the width of the image, j is increased by one and i is reset to zero. Thereafter, $f^{(m,s)}$ (i,j) is determined while scanning the source image. Once pixel correspondence is determined for all the points, it means that a single mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is determined next. The position of $q_{f(i,j+1)}$ is constrained by the position of $q_{f(i,j)}$ since the position of $q_{f(i,j+1)}$ satisfies the BC. Thus, in this system, a point whose corresponding point is determined earlier is given higher priority. If the situation continues in which (0,0) is always given the highest priority, the final mapping might be unnecessarily biased. In order to avoid this bias, $f^{(m,s)}$ is determined in the following manner in the premised technology.

First, when (s mod 4) is 0, $f^{(m,s)}$ is determined starting from (0,0) while gradually increasing both i and j. When (s mod 4) is 1, $f^{(m,s)}$ is determined starting from the top rightmost location while decreasing i and increasing j. When (s mod 4) is 2, $f^{(m,s)}$ is determined starting from the bottom rightmost location while decreasing both i and j. When (s mod 4) is 3, $f^{(m,s)}$ is determined starting from the bottom leftmost location while increasing i and decreasing j. Since a concept such as the submapping, that is, a parameter s, does not exist in the finest n-th level, $f^{(m,s)}$ is computed continuously in two directions on the assumption that s=0 and s=2.

In this implementation, the values of $f^{(m,s)}$ (i,j) (m=0, ..., n) that satisfy the BC are chosen as much as possible from the candidates (k,l) by imposing a penalty on the candidates violating the BC. The energy $D_{(k,l)}$ of a candidate that violates the third condition of the BC is multiplied by $\phi$ and that of a candidate that violates the first or second condition of the BC is multiplied by $\psi$. In this implementation, $\phi=2$ and $\psi=100000$ are used.

In order to check the above-mentioned BC, the following test may be performed as the procedure when determining (k,l)=$f^{(m,s)}$ (i,j). Namely, for each grid point (k,l) in the inherited quadrilateral of $f^{(m,s)}$ (i,j), whether or not the z-component of the outer product of $$\vec{W} = \vec{A} \times \vec{B} \quad (39)$$

is equal to or greater than 0 is examined, where $$\vec{A} = \overline{q_{f^{(m,s)}(i,j-1)}^{(m,s)} q_{f^{(m,s)}(i+1,j-1)}^{(m,s)}} \quad (40)$$

$$\vec{B} = \overline{q_{f^{(m,s)}(i,j-1)}^{(m,s)} q_{(k,l)}^{(m,s)}} \quad (41)$$

Here, the vectors are regarded as 3D vectors and the z-axis is defined in the orthogonal right-hand coordinate system.

When W is negative, the candidate is imposed with a penalty by multiplying $D_{(k,l)}^{(m,s)}$ by $\psi$ so that it is not as likely to be selected.

Figure 5A:
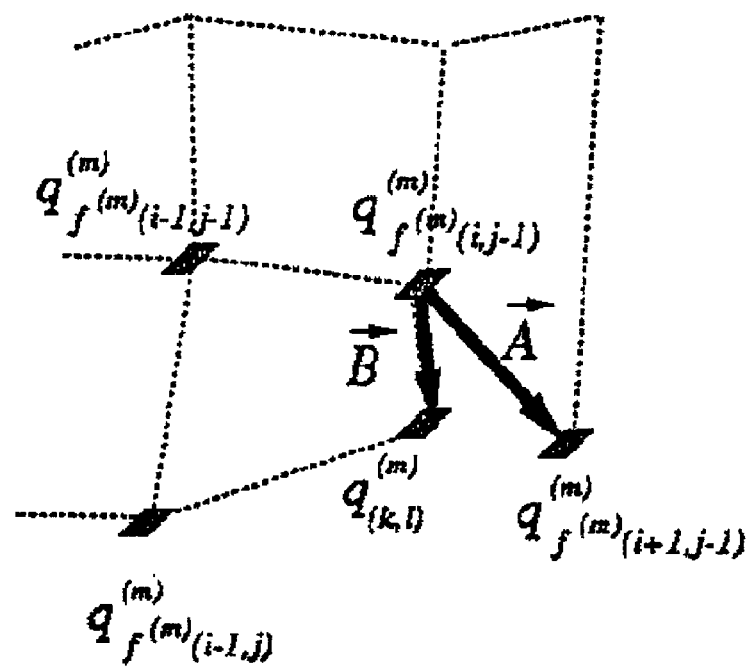
FIG. 5a is a diagram illustrating determination of whether or not the mapping for a certain point satisfies the bijectivity condition through the outer product computation.
Figure 5B:
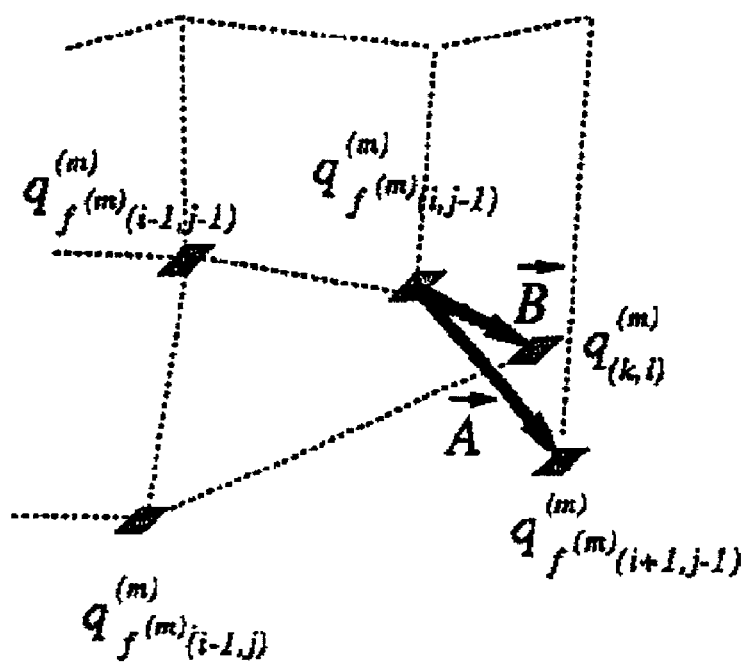
FIG. 5b is a diagram illustrating determination of whether or not the mapping for a certain point satisfies the bijectivity condition through the outer product computation.

FIGS. 5(a) and 5(b) illustrate the reason why this condition is inspected. FIG. 5(a) shows a candidate without a penalty and FIG. 5(b) shows one with a penalty. When determining the mapping $f^{(m,s)}$ (i,j+1) for the adjacent pixel at (i,j+1), there is no pixel on the source image plane that satisfies the BC if the z-component of W is negative because then $q_{(k,l)}^{(m,s)}$ passes the boundary of the adjacent quadrilateral.

[1. 7. 1] The Order of Submappings

In this implementation, σ (0)=0, σ (1)=1, σ (2)=2, σ (3)=3, σ (4) =0 are used when the resolution level is even, while σ (0)=3, σ (1)=2, σ (2)=1, σ (3)=0, σ (4)=3 are used when the resolution level is odd. Thus, the submappings are shuffled to some extent. It is to be noted that the submappings are primarily of four types, and s may be any of 0 to 3. However, a processing with s=4 is used in this implementation for a reason to be described later.

[1. 8] Interpolations

After the mapping between the source and destination images is determined, the intensity values of the corresponding pixels are interpolated. In the implementation, trilinear interpolation is used. Suppose that a square $p_{(i,j)}p_{(i+1,j)}p_{(i+1,j+1)}p_{(i,j+1)}$ on the source image plane is mapped to a quadrilateral $q_{f(i,j)}q_{f(i+1,j)}q_{f(i+1,j+1)}q_{f(i,j+1)}$ on the destination image plane. For simplicity, the distance between the image planes is assumed to be 1. The intermediate image pixels r(x, y, t) (0≤x≤N−1, 0≤y≤M−1) whose distance from the source image plane is t (0≤t≤1) are obtained as follows. First, the location of the pixel r(x, y, t), where x, y, t∈R, is determined by equation (42):

$$(x, y) = (1 - dx)(1 - dy)(1 - t)(i, j) + (1 - dy)tf(i, j) + \quad (42)$$
$$dx(1 - dy)(1 - t)(i+1, j) + dx(1 - dy)tf(i+1, j) +$$
$$(1 - dx)dy(1 - t)(i, j+1) + (1 - dx)dytf(i, j+1) +$$
$$dxdy(1 - t)(i+1, j+1) + dxdytf(i+1, j+1)$$

The value of the pixel intensity at r(x,y,t) is then determined by equation (43):

$$V(r, (x, y, t)) = (1 - dx)(1 - dy)(1 - t)V(p_{(i,j)}) + (1 - dx)(1 - dy)tV(q_{f(i,j)}) + \quad (43)$$
$$dx(1 - dy)(1 - t)V(p_{(i+1,j)}) + dx(1 - dy)tV(q_{f(i+1,j)}) +$$
$$(1 - dx)dy(1 - t)V(p_{(i,j+1)}) + (1 - dx)dytV(q_{f(i,j+1)}) +$$
$$dxdy(1 - t)V(p_{(i+1,j+1)}) + dxdytV(q_{f(i+1,j+1)})$$

where dx and dy are parameters varying from 0 to 1.

[1. 9] Mapping to which Constraints are Imposed

So far, the determination of a mapping in which no constraints are imposed has been described. However, if a correspondence between particular pixels of the source and destination images is provided in a predetermined manner, the mapping can be determined using such correspondence as a constraint.

The basic idea is that the source image is roughly deformed by an approximate mapping which maps the specified pixels of the source image to the specified pixels of the destination image and thereafter a mapping f is accurately computed.

First, the specified pixels of the source image are mapped to the specified pixels of the destination image, then the approximate mapping that maps other pixels of the source image to appropriate locations are determined. In other words, the mapping is such that pixels in the vicinity of a specified pixel are mapped to locations near the position to which the specified one is mapped. Here, the approximate mapping at the m-th level in the resolution hierarchy is denoted by $F^{(m)}$.

The approximate mapping F is determined in the following manner. First, the mappings for several pixels are specified. When $n_s$ pixels $$p(i_0,j_0), p(i_1,j_1), \ldots, p(i_{n_s-1}, j_{n_s-1}) \qquad (44)$$

of the source image are specified, the following values in the equation (45) are determined.

$$F^{(n)}(i_0,j_0)=(k_0,l_0),$$

$$F^{(n)}(i_1,j_1)=(k_1,l_1), \ldots,$$

$$F^{(n)}(i_{n_s-1},j_{n_s-1})=(k_{n_s-1},l_{n_s-1}) \qquad (45)$$

For the remaining pixels of the source image, the amount of displacement is the weighted average of the displacement of $p(i_h, j_h)$ ($h=0, \ldots, n_s-1$). Namely, a pixel $p_{(i,j)}$ is mapped to the following pixel (expressed by the equation (46)) of the destination image.

$$F^{(m)}(i,j) = \frac{(i,j) + \sum_{h=0}^{h=n_s-1}(k_h - i_h, l_h - j_h) weight_h(i,j)}{2^{n-m}} \qquad (46)$$

where $$weight_h(i,j) = \frac{1/\|(i_h - i, j_h - j)\|^2}{total\_weight(i,j)} \qquad (47)$$

where $$total\_weight(i,j) = \sum_{h=0}^{h=n_s-1} 1/\|(i_h - i, j_h - j)\|^2 \qquad (48)$$

Second, the energy $D_{(i,j)}^{(m,s)}$ of the candidate mapping f is changed so that a mapping f similar to $F^{(m)}$ has a lower energy. Precisely speaking, $D_{(i,j)}^{(m,s)}$ is expressed by the equation (49):

$$D_{(i,j)}^{(m,s)} = E_{0_{(i,j)}}^{(m,s)} + \eta E_{1_{(i,j)}}^{(m,s)} + \kappa E_{2_{(i,j)}}^{(m,s)} \qquad (49)$$

where $$E_{2(i,j)}^{(m,s)} = \begin{cases} 0, & \text{if } \|F^{(m)}(i,j) - f^{(m,s)}(i,j)\|^2 \leq \left\lfloor \frac{\rho^2}{2^{2(n-m)}} \right\rfloor \\ \|F^{(m)}(i,j) - f^{(m,s)}(i,j)\|^2, & \text{otherwise} \end{cases} \qquad (50)$$

where $\kappa, \rho \geq 0$. Finally, the resulting mapping f is determined by the above-described automatic computing process.

Note that $E_{2_{(i,j)}}^{(m,s)}$ becomes 0 if $f^{(m,s)}(i,j)$ is sufficiently close to $F^{(m)}(i,j)$ i.e., the distance therebetween is equal to or less than $$\left\lfloor \frac{\rho^2}{2^{2(n-m)}} \right\rfloor \qquad (51)$$

This has been defined in this way because it is desirable to determine each value $f^{(m,s)}(i,j)$ automatically to fit in an appropriate place in the destination image as long as each value $f^{(m,s)}(i,j)$ is close to $F^{(m,s)}(i,j)$. For this reason, there is no need to specify the precise correspondence in detail to have the source image automatically mapped so that the source image matches the destination image.

[2] Concrete Processing Procedure

The flow of a process utilizing the respective elemental techniques described in [1] will now be described.

Figure 6:
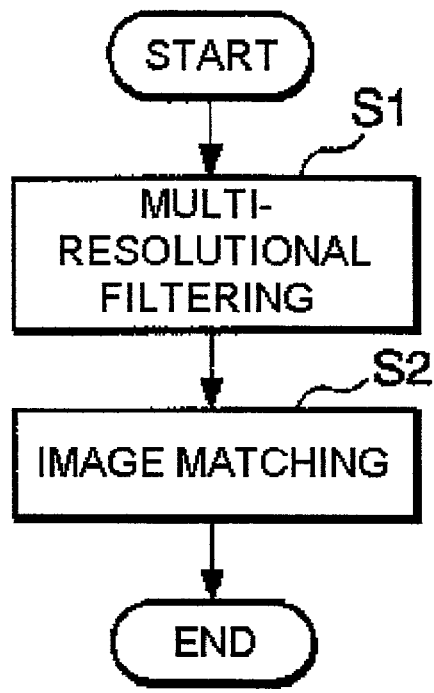
FIG. 6 is a flowchart of the entire procedure of a preferred embodiment in the premised technology.

FIG. 6 is a flowchart of the overall procedure of the premised technology. Referring to FIG. 6, a source image and destination image are first processed using a multiresolutional critical point filter (S1). The source image and the destination image are then matched (S2). As will be understood, the matching (S2) is not required in every case, and other processing such as image recognition may be performed instead, based on the characteristics of the source image obtained at S1.

Figure 7:
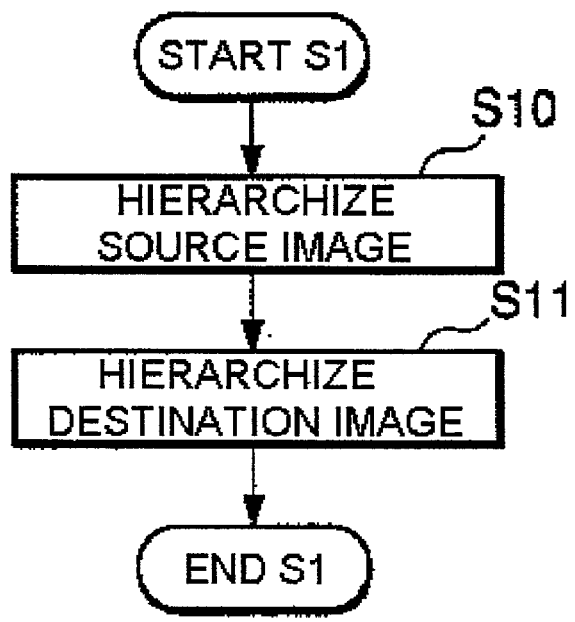
FIG. 7 is a flowchart showing the details of the process at S1 in FIG. 6.

FIG. 7 is a flowchart showing details of the process S1 shown in FIG. 6. This process is performed on the assumption that a source image and a destination image are matched at S2. Thus, a source image is first hierarchized using a critical point filter (S10) so as to obtain a series of source hierarchical images. Then, a destination image is hierarchized in the similar manner (S11) so as to obtain a series of destination hierarchical images. The order of S10 and S11 in the flow is arbitrary, and the source image and the destination image can be generated in parallel. It may also be possible to process a number of source and destination images as required by subsequent processes.

Figure 8:
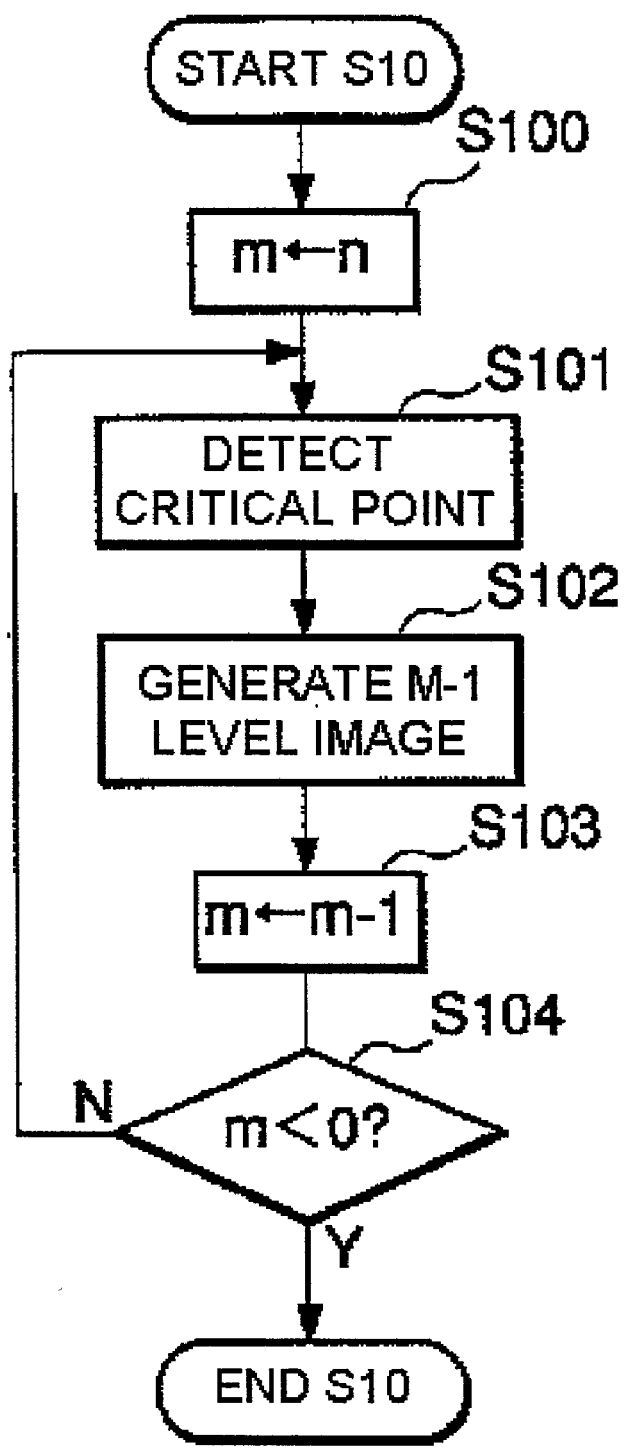
FIG. 8 is a flowchart showing the details of the process at S10 in FIG. 7.

FIG. 8 is a flowchart showing details of the process at S10 shown in FIG. 7. Suppose that the size of the original source image is $2^n \times 2^n$. Since source hierarchical images are sequentially generated from an image with a finer resolution to one with a coarser resolution, the parameter m which indicates the level of resolution to be processed is set to n (S100). Then, critical points are detected from the images $p^{(m,0)}$, $p^{(m,1)}$, $p^{(m,2)}$ and $p^{(m,3)}$ the m-th level of resolution, using a critical point filter (S101), so that the images $p^{(m-1,0)}$, $p^{(m-1,1)}$, $p^{(m-1,2)}$ and $p^{(m-1,3)}$ of the (m-1)th level are generated (S102). Since m=n here, $p^{(m,0)}=p^{(m,1)}=p^{(m,2)}=p^{(m,3)}=p^{(n)}$ holds and four types of subimages are thus generated from a single source image.

Figure 9:
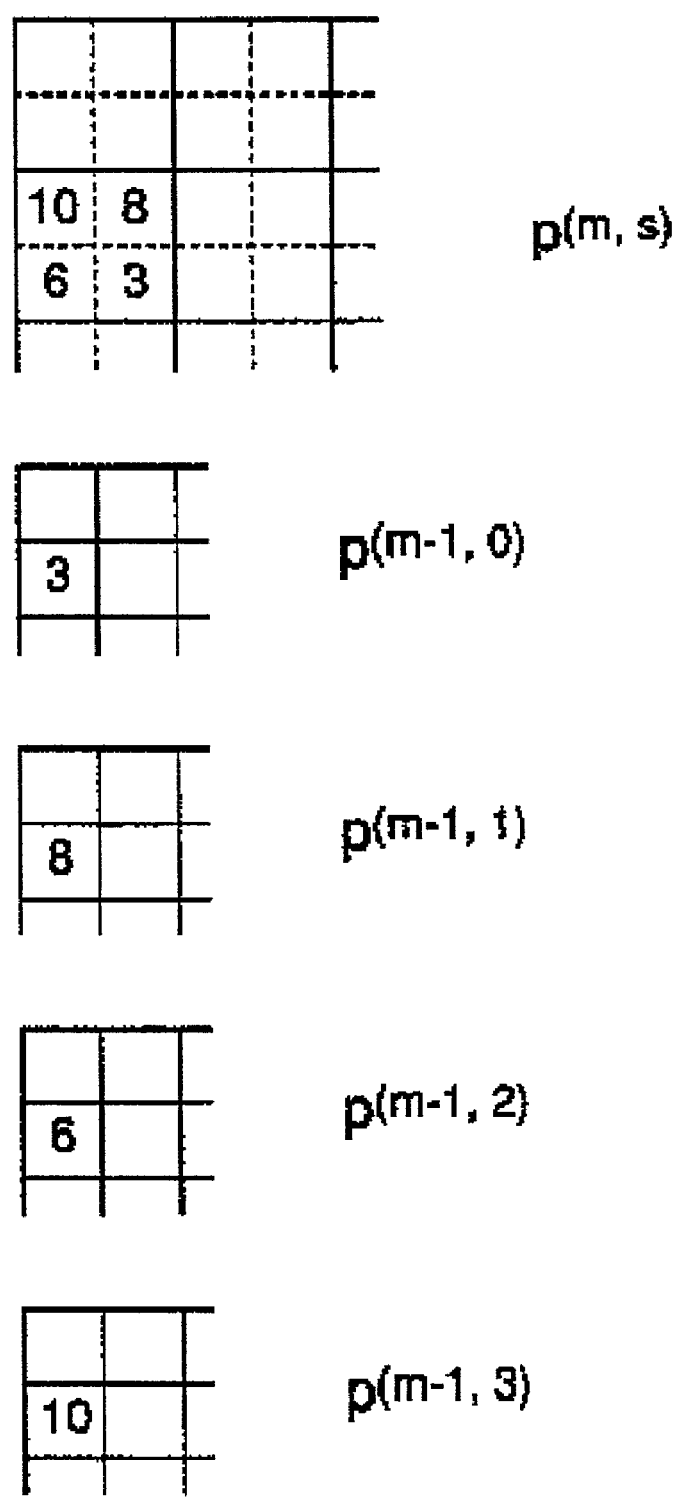

FIG. 9 shows correspondence between partial images of the m-th and those of (m-1)th levels of resolution. Referring to FIG. 9, respective numberic values shown in the figure represent the intensity of respective pixels. $p^{(m,s)}$ symbolizes any one of four images $p^{(m,0)}$ through $p^{(m,3)}$, and when generating $p^{(m-1,0)}$, $p^{(m,0)}$ is used from $p^{(m,s)}$. For example, as for the block shown in FIG. 9, comprising four pixels with their pixel intensity values indicated inside, images $p^{(m-1,0)}$, $p^{(m-1,1)}$, $p^{(m-1,2)}$ and $p^{(m-1,3)}$ acquire "3", "8", "6" and "10", respectively, according to the rules described in [1.2]. This block at the m-th level is replaced at the (m−1)th level by respective single pixels thus acquired. Therefore, the size of the subimages at the (m−1)th level is $2^{m-1} \times 2^{m-1}$.

After m is decremented (S103 in FIG. 8), it is ensured that m is not negative (S104). Thereafter, the process returns to S101, so that subimages of the next level of resolution, i.e., a next coarser level, are generated. The above process is repeated until subimages at m=0 (0-th level) are generated to complete the process at S10. The size of the subimages at the 0-th level is 1×1.

Figure 10:
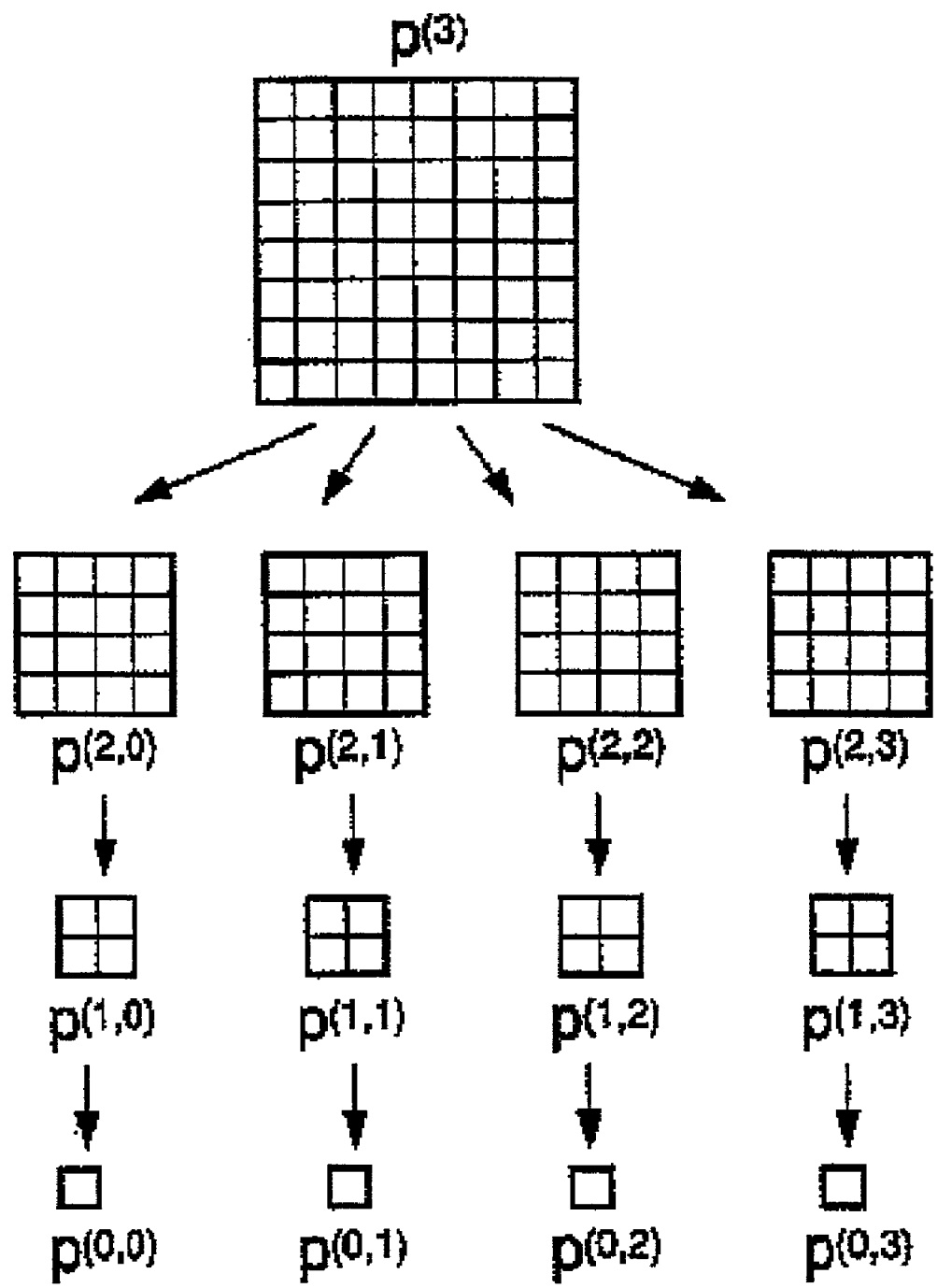
FIG. 10 is a diagram showing source images generated in the embodiment in the premised technology.

FIG. 10 shows source hierarchical images generated at S10 in the case of n=3. The initial source image is the only image common to the four series followed. The four types of subimages are generated independently, depending on the type of critical point. Note that the process in FIG. 8 is common to S11 shown in FIG. 7, and that destination hierarchical images are generated through a similar procedure. Then, the process at S1 in FIG. 6 is completed.

Figure 11:
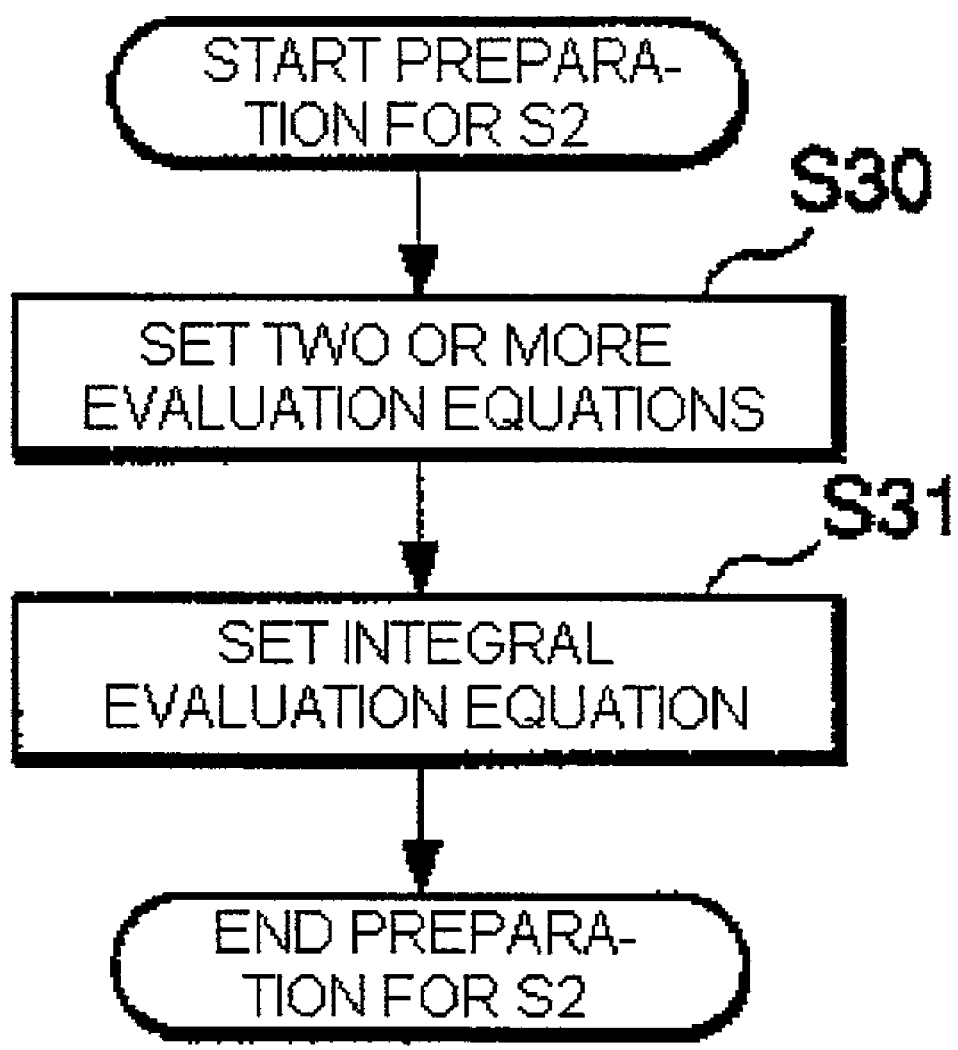
FIG. 11 is a flowchart of a preparation procedure for S2 in FIG. 6.

In this premised technology, in order to proceed to S2 shown in FIG. 6 a matching evaluation is prepared. FIG. 11 shows the preparation procedure. Referring to FIG. 11, a plurality of evaluation equations are set (S30). The evaluation equations may include the energy $C_f^{(m,s)}$ concerning a pixel value, introduced in [1.3.2.1], and the energy $D_f^{(m,s)}$ concerning the smoothness of the mapping introduced in [1.3.2.2]. Next, by combining these evaluation equations, a combined evaluation equation is set (S31). Such a combined evaluation equation may be $\lambda C_{(i,j)}^{(m,s)} + D_f^{(m,s)}$. Using $\eta$ introduced in [1.3.2.2], we have $$\sum \sum (\lambda C_{(i,j)}^{(m,s)} + \eta E_{0(i,j)}^{(m,s)} + E_{1(i,j)}^{(m,s)}) \qquad (52)$$

In the equation (52) the sum is taken for each i and j where i and j run through $0, 1, \ldots, 2^{m-1}$. Now, the preparation for matching evaluation is completed.

Figure 12:
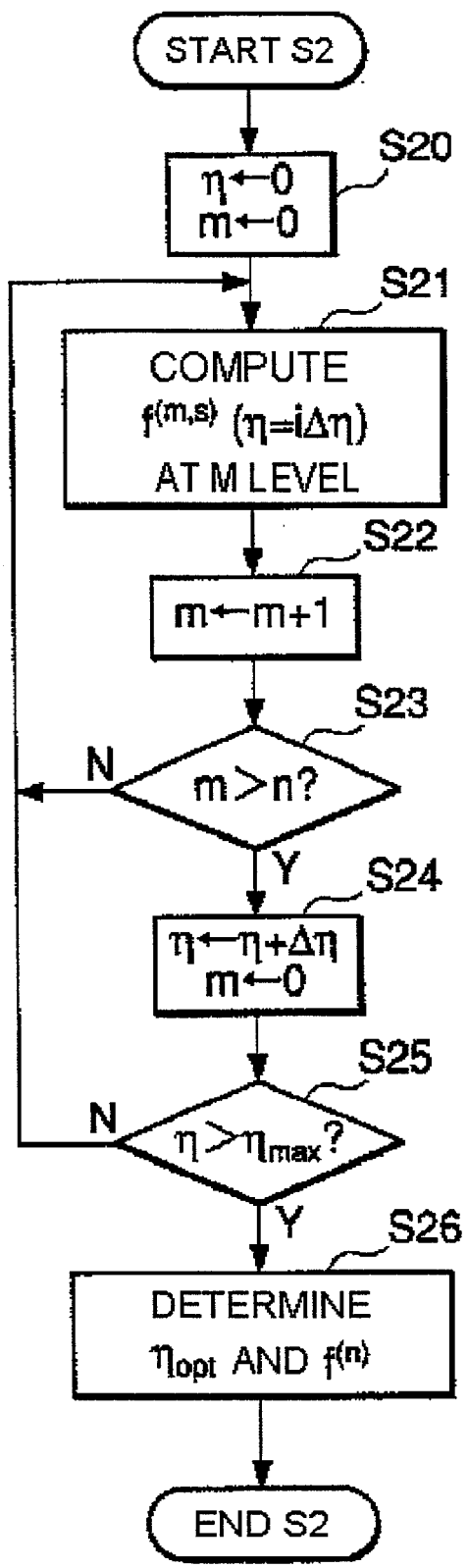
FIG. 12 is a flowchart showing the details of the process at S2 in FIG. 6.

FIG. 12 is a flowchart showing the details of the process of S2 shown in FIG. 6. As described in [1], the source hierarchical images and destination hierarchical images are matched between images having the same level of resolution. In order to detect global correspondence correctly, a matching is calculated in sequence from a coarse level to a fine level of resolution. Since the source and destination hierarchical images are generated using the critical point filter, the location and intensity of critical points are stored clearly even at a coarse level. Thus, the result of the global matching is superior to conventional methods.

Referring to FIG. 12, a coefficient parameter $\eta$ and a level parameter m are set to 0 (S20). Then, a matching is computed between the four subimages at the m-th level of the source hierarchical images and those of the destination hierarchical images at the m-th level, so that four types of submappings $f^{(m,s)}$ (s=0, 1, 2, 3) which satisfy the BC and minimize the energy are obtained (S21). The BC is checked by using the inherited quadrilateral described in [1.3.3]. In that case, the submappings at the m-th level are constrained by those at the (m−1)th level, as indicated by the equations (17) and (18). Thus, the matching computed at a coarser level of resolution is used in subsequent calculation of a matching. This is called a vertical reference between different levels. If m=0, there is no coarser level and this exceptional case will be described using FIG. 13.

A horizontal reference within the same level is also performed. As indicated by the equation (20) in [1.3.3], $f^{(m,3)}$, $f^{(m,2)}$ and $f^{(m,1)}$ are respectively determined so as to be analogous to $f^{(m,2)}$, $f^{(m,1)}$ and $f^{(m,0)}$. This is because a situation in which the submappings are totally different seems unnatural even though the type of critical points differs so long as the critical points are originally included in the same source and destination images. As can been seen from the equation (20), the closer the submappings are to each other, the smaller the energy becomes, so that the matching is then considered more satisfactory.

As for $f^{(m,0)}$, which is to be initially determined, a coarser level by one may be referred to since there is no other submapping at the same level to be referred to as shown in the equation (19). In this premised technology, however, a procedure is adopted such that after the submappings were obtained up to $f^{(m,3)}$, $f^{(m,0)}$ is recalculated once utilizing the thus obtained submappings as a constraint. This procedure is equivalent to a process in which s=4 is substituted into the equation (20) and $f^{(m,4)}$ is set to $f^{(m,0)}$ anew. The above process is employed to avoid the tendency in which the degree of association between $f^{(m,0)}$ and $f^{(m,3)}$ becomes too low. This scheme actually produced a preferable result. In addition to this scheme, the submappings are shuffled in the experiment as described in [1.7.1], so as to closely maintain the degrees of association among submappings which are originally determined independently for each type of critical point. Furthermore, in order to prevent the tendency of being dependent on the starting point in the process, the location thereof is changed according to the value of s as described in [1.7].

Figure 13:
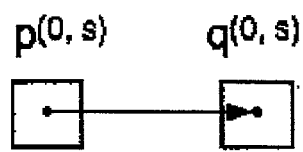
FIG. 13 is a diagram showing the way a submapping is determined at the 0-th level.
Figure 14:
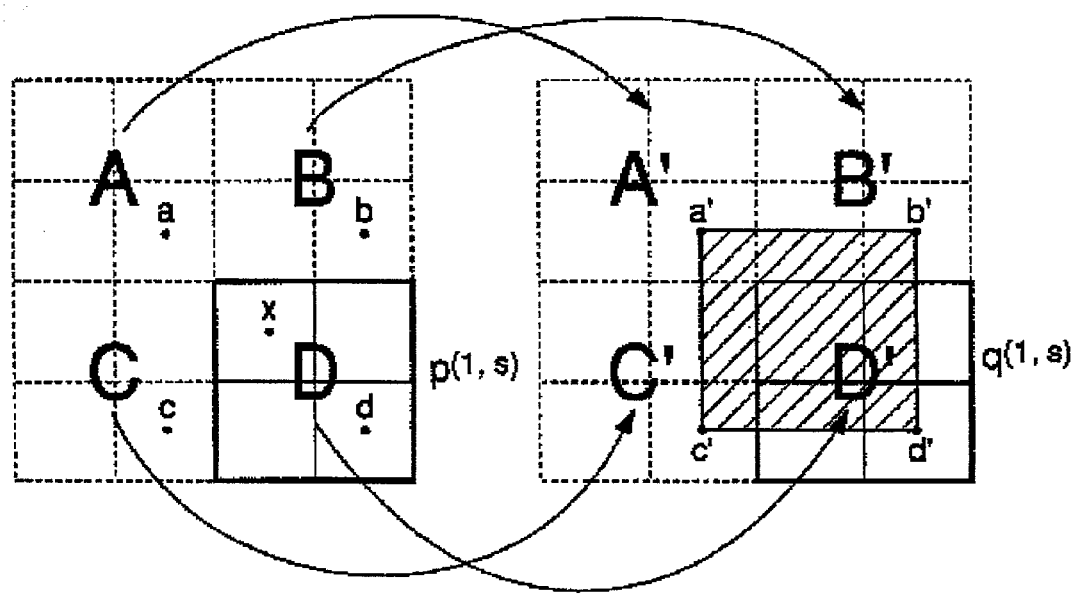
FIG. 14 is a diagram showing the way a submapping is determined at the first level.

FIG. 13 illustrates how the submapping is determined at the 0-th level. Since at the 0-th level each sub-image is consititituted by a single pixel, the four submappings $f^{(0,s)}$ are automatically chosen as the identity mapping. FIG. 14 shows how the submappings are determined at the first level. At the first level, each of the sub-images is constituted of four pixels, which are indicated by solid lines. When a corresponding point (pixel) of the point (pixel) x in $p^{(1,s)}$ is searched within $q^{(1,s)}$, the following procedure is adopted:

1. An upper left point a, an upper right point b, a lower left point c and a lower right point d with respect to the point x are obtained at the first level of resolution.
2. Pixels to which the points a to d belong at a coarser level by one, i.e., the 0-th level, are searched. In FIG. 14, the points a to d belong to the pixels A to D, respectively. However, the pixels A to C are virtual pixels which do not exist in reality.
3. The corresponding points A' to D' of the pixels A to D, which have already been defined at the 0-th level, are plotted in $q^{(1,s)}$. The pixels A' to C' are virtual pixels and regarded to be located at the same positions as the pixels A to C.
4. The corresponding point a' to the point a in the pixel A is regarded as being located inside the pixel A', and the point a' is plotted. Then, it is assumed that the position occupied by the point a in the pixel A (in this case, positioned at the lower right) is the same as the position occupied by the point a' in the pixel A'.
5. The corresponding points b' to d' are plotted by using the same method as the above 4 so as to produce an inherited quadrilateral defined by the points a' to d'.
6. The corresponding point x' of the point x is searched such that the energy becomes minimum in the inherited quadrilateral. Candidate corresponding points x' may be limited to the pixels, for instance, whose centers are included in the inherited quadrilateral. In the case shown in FIG. 14, the four pixels all become candidates.

The above described is a procedure for determining the corresponding point of a given point x. The same processing is performed on all other points so as to determine the submappings. As the inherited quadrilateral is expected to become deformed at the upper levels (higher than the second level), the pixels A' to D' will be positioned apart from one another as shown in FIG. 3.

Once the four submappings at the m-th level are determined in this manner, m is incremented (S22 in FIG. 12). Then, when it is confirmed that m does not exceed n (S23), return to S21. Thereafter, every time the process returns to S21, submappings at a finer level of resolution are obtained until the process finally returns to S21 at which time the mapping $f^{(n)}$ at the n-th level is determined. This mapping is denoted as $f^{(n)}$ ($\eta=0$) because it has been determined relative to $\eta=0$.

Next, to obtain the mapping with respect to other different $\eta$, $\eta$ is shifted by $\Delta\eta$ and m is reset to zero (S24). After confirming that new $\eta$ does not exceed a predetermined search-stop value $\eta_{max}$ (S25), the process returns to S21 and the mapping $f^{(n)}$ ($\eta=\Delta\eta$) relative to the new $\eta$ is obtained. This process is repeated while obtaining $f^{(n)}$ ($\eta=i\Delta\eta$) (i=0,1, ... ) at S21. When $\eta$ exceeds $\eta_{max}$, the process proceeds to S26 and the optimal $\eta=\eta_{opt}$ is determined using a method described later, so as to let $f^{(n)}$ ($\eta=\eta_{opt}$) be the final mapping $f^{(n)}$.

Figure 15:
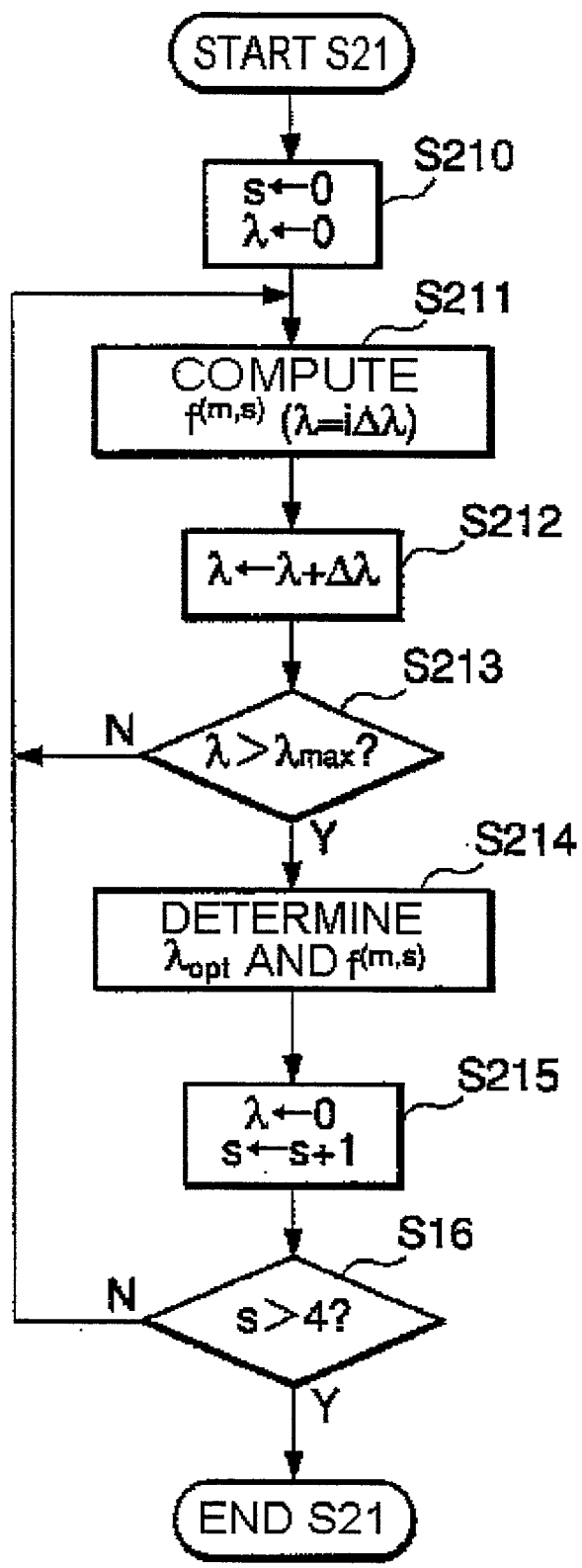
FIG. 15 is a flowchart showing the details of the process at S21 in FIG. 6.

FIG. 15 is a flowchart showing the details of the process of S21 shown in FIG. 12. According to this flowchart, the submappings at the m-th level are determined for a certain predetermined $\eta$. In this premised technology, when determining the mappings, the optimal $\lambda$ is defined independently for each submapping.

Referring to FIG. 15, s and $\lambda$ are first reset to zero (S210). Then, obtained is the submapping $f^{(m,s)}$ that minimizes the energy with respect to the then $\lambda$ (and, implicitly, $\eta$) (S211), and the thus obtained submapping is denoted as $f^{(m,s)}$ ($\lambda=0$). In order to obtain the mapping with respect to other different $\lambda$, $\lambda$ is shifted by $\Delta\lambda$. After confirming that the new $\lambda$ does not exceed a predetermined search-stop value $\lambda_{max}$ (S213), the process returns to S211 and the mapping $f^{(m,s)}$ ($\lambda=\Delta\lambda$) relative to the new $\lambda$ is obtained. This process is repeated while obtaining $f^{(m,s)}$ ($\lambda=i\Delta\lambda$) (i=0, 1, ... ). When $\lambda$ exceeds $\lambda_{max}$, the process proceeds to S214 and the optimal $\lambda=\lambda_{opt}$ is determined, so as to let $f^{(n)}$ ($\lambda=\lambda_{opt}$) be the final mapping $f^{(m,s)}$ (S214).

Next, in order to obtain other submappings at the same level, $\lambda$ is reset to zero and s is incremented (S215). After confirming that s does not exceed 4 (S216), return to S211. When s=4, $f^{(m,0)}$ is renewed utilizing $f^{(m,3)}$ as described above and a submapping at that level is determined.

Figure 16:
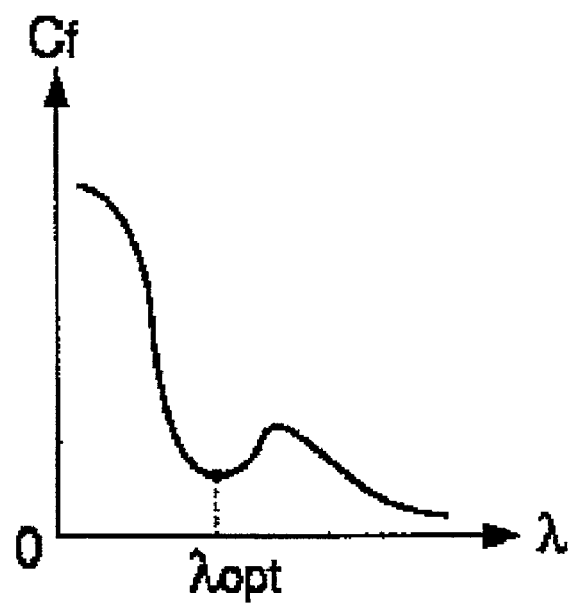
FIG. 16 is a graph showing the behavior of energy $C_f^{(m,s)}$ corresponding to $f^{(m,s)}$ ($\lambda = i\Delta\lambda$) which has been obtained for a certain $f^{(m,s)}$ while changing $\lambda$.

FIG. 16 shows the behavior of the energy $C_f^{(m,s)}$ corresponding to $f^{(m,s)}$ ($\lambda=i\Delta\lambda$) (i=0,1, ... ) for a certain m and s while varying $\lambda$. As described in [1.4], as $\lambda$ increases, $C_f^{(m,s)}$ normally decreases but changes to increase after $\lambda$ exceeds the optimal value. In this premised technology, $\lambda$ in which $C_f^{(m,s)}$ becomes the minima is defined as $\lambda_{opt}$. As observed in FIG. 16, even if $C_f^{(m,s)}$ begins to decrease again in the range $\lambda>\lambda_{opt}$, the mapping will not be as good. For this reason, it suffices to pay attention to the first occurring minima value. In this premised technology, $\lambda_{opt}$ is independently determined for each submapping including $f^{(n)}$.

Figure 17:
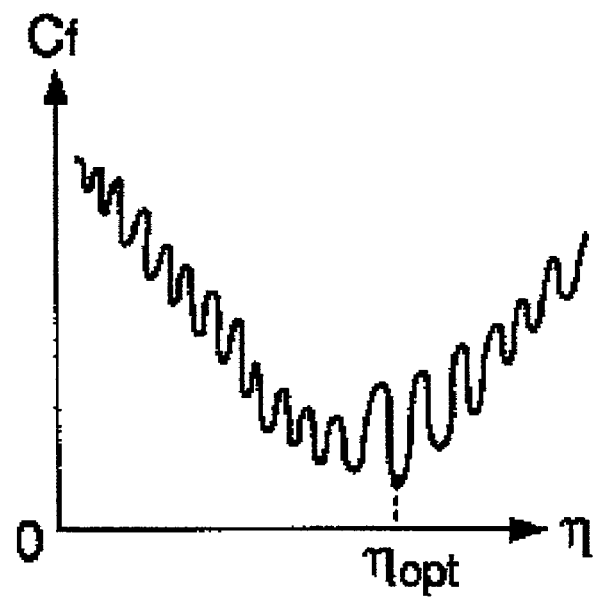
FIG. 17 is a diagram showing the behavior of energy $C_f^{(n)}$ corresponding to $f^{(n)}$ ($\eta = i\Delta\eta$) (i=0,1, ... ) which has been obtained while changing $\eta$.

FIG. 17 shows the behavior of the energy $C_f^{(n)}$ corresponding to $f_f^{(n)}$ ($\eta=i\Delta\eta$) (i=0,1 ... ) while varying $\eta$. Here too, $C_f^{(n)}$ normally decreases as $\eta$ increases, but $C_f^{(n)}$ changes to increase after $\eta$ exceeds the optimal value. Thus, $\eta$ in which $C_f^{(n)}$ becomes the minima is defined as $\eta_{opt}$. FIG. 17 can be considered as an enlarged graph around zero along the horizontal axis shown in FIG. 4. Once $\eta_{opt}$ is determined, $f^{(n)}$ can be finally determined.

As described above, this premised technology provides various merits. First, since there is no need to detect edges, problems in connection with the conventional techniques of the edge detection type are solved. Furthermore, prior knowledge about objects included in an image is not necessitated, thus automatic detection of corresponding points is achieved. Using the critical point filter, it is possible to preserve intensity and locations of critical points even at a coarse level of resolution, thus being extremely advantageous when applied to object recognition, characteristic extraction, and image matching. As a result, it is possible to construct an image processing system which significantly reduces manual labor.

Some further extensions to or modifications of the above-described premised technology may be made as follows:

(1) Parameters are automatically determined when the matching is computed between the source and destination hierarchical images in the premised technology. This method can be applied not only to the calculation of the matching between the hierarchical images but also to computing the matching between two images in general.

For instance, an energy $E_0$ relative to a difference in the intensity of pixels and an energy $E_1$ relative to a positional displacement of pixels between two images may be used as evaluation equations, and a linear sum of these equations, i.e., $E_{tot}=\alpha E_0+E_1$, may be used as a combined evaluation equation. While paying attention to the neighborhood of the extrema in this combined evaluation equation, $\alpha$ is automatically determined. Namely, mappings which minimize $E_{tot}$ are obtained for various $\alpha$'s. Among such mappings, $\alpha$ at which $E_{tot}$ takes the minimum value is defined as an optimal parameter. The mapping corresponding to this parameter is finally regarded as the optimal mapping between the two images.

Many other methods are available in the course of setting up evaluation equations. For instance, a term which becomes larger as the evaluation result becomes more favorable, such as $1/E_1$ and $1/E_2$, may be employed. A combined evaluation equation is not necessarily a linear sum, but an n-powered sum (n=2, ½, −1, −2, etc.), a polynomial or an arbitrary function may be employed when appropriate.

The system may employ a single parameter such as the above $\alpha$, two parameters such as $\eta$ and $\lambda$ as in the premised technology, or more than two parameters. When there are more than three parameters used, they may be determined while changing one at a time.

(2) In the premised technology, a parameter is determined in a two-step process. That is, in such a manner that a point at which $C_f^{(m,s)}$ takes the minima is detected after a mapping such that the value of the combined evaluation equation becomes minimum is determined. However, instead of this two-step processing, a parameter may be effectively determined, as the case may be, in a manner such that the minimum value of a combined evaluation equation becomes minimum. In this case, $\alpha E_0+\beta E_1$, for example, may be used as the combined evaluation equation, where $\alpha+\beta-1$ may be imposed as a constraint so as to equally treat each evaluation equation. The automatic determination of a parameter is effective when determining the parameter such that the energy becomes minimum.

(3) In the premised technology, four types of submappings related to four types of critical points are generated at each level of resolution. However, one, two, or three types among the four types may be selectively used. For instance, if there exists only one bright point in an image, generation of hierarchical images based solely on $f^{(m,3)}$ related to a maxima point can be effective to a certain degree. In this case, no other submapping is necessary at the same level, thus the amount of computation relative on s is effectively reduced.

(4) In the premised technology, as the level of resolution of an image advances by one through a critical point filter, the number of pixels becomes ¼. However, it is possible to suppose that one block consists of 3×3 pixels and critical points are searched in this 3×3 block, then the number of pixels will be ⅑ as the level advances by one.

(5) In the premised technology, if the source and the destination images are color images, they would generally first be converted to monochrome images, and the mappings then computed. The source color images may then be transformed by using the mappings thus obtained. However, as an alternate method, the submappings may be computed regarding each RGB component.

Preferred Embodiments for Image Interpolation

Image interpolation techniques based on the above-described premised technology will now be described. Firstly, a mesh is introduced to provide more efficient compression of a corresponding point file between two images, and thereafter an image interpolation apparatus will be described with reference to FIG. 23.

Figure 18:
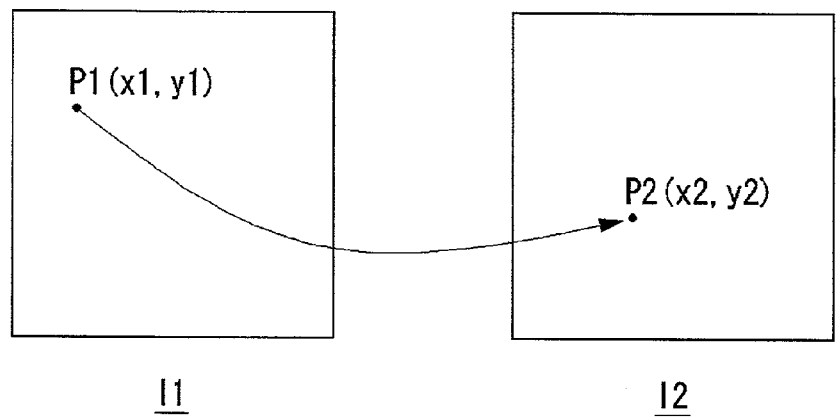
FIG. 18 shows how certain pixels correspond between the first image and the second image.

FIG. 18 shows a first image I1 and a second image I2, which serve as key frames, where certain pixels $p_1(x_1, y_1)$ and $p_2(x_2, y_2)$ correspond therebetween. The correspondence between these pixels is obtained using the premised technology described above.

Figure 19:
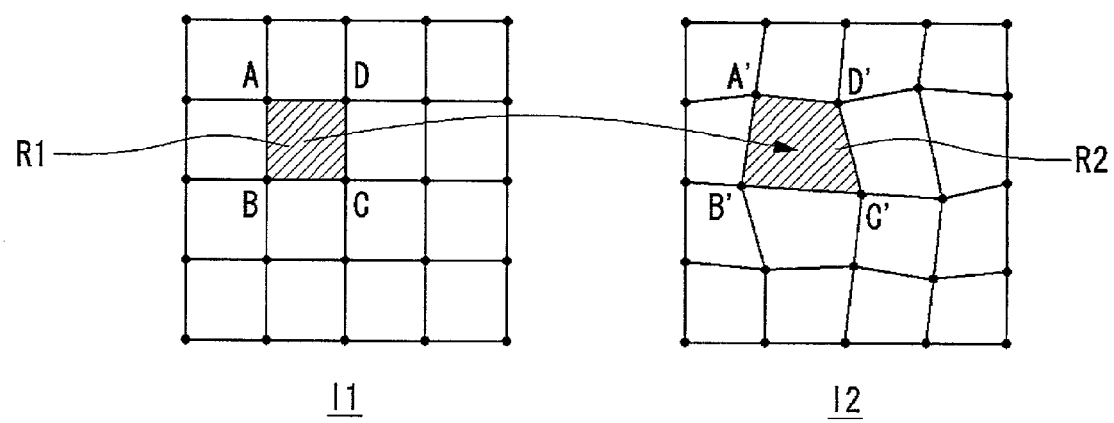
FIG. 19 shows a correspondence relation between a source polygon taken on the first image and a destination polygon taken on the second image.

Referring to FIG. 19, when a mesh is provided on the first image I1, a corresponding mesh can be formed on the second image I2. Now, a polygon R1 on the first image I1 is determined by four lattice points A, B. C and D. This polygon R1 is called a "source polygon." As has been shown in FIG. 18, these lattice points A, B, C and D have respectively corresponding points A', B', C' and D' on the second image I2, and a polygon R2 formed by the corresponding points is called a "destination polygon." In this embodiment, the source polygon is generally a rectangle while the destination polygon is generally a quadrilateral. In any event, according to the present embodiment, the correspondence relation between the first and second images is not described pixel by pixel, instead, the corresponding pixels are described with respect to the lattice points of the source polygon. Such a description is made available in a corresponding point file. By directing attention to the lattice points, storage capacity (data volume) for the corresponding point file can be reduced significantly.

The corresponding point file is utilized for generating an intermediate image between the first image I1 and the second image I2. As described in the premised technology section above, intermediate images at arbitrary temporal position can be generated by interpolating positions between the corresponding points. Thus, storing the first image I1, the second image I2 and the corresponding point file allows morphing between two images and the generation of smooth motion pictures between two images, thus providing a compression effect for motion pictures.

Figure 20:
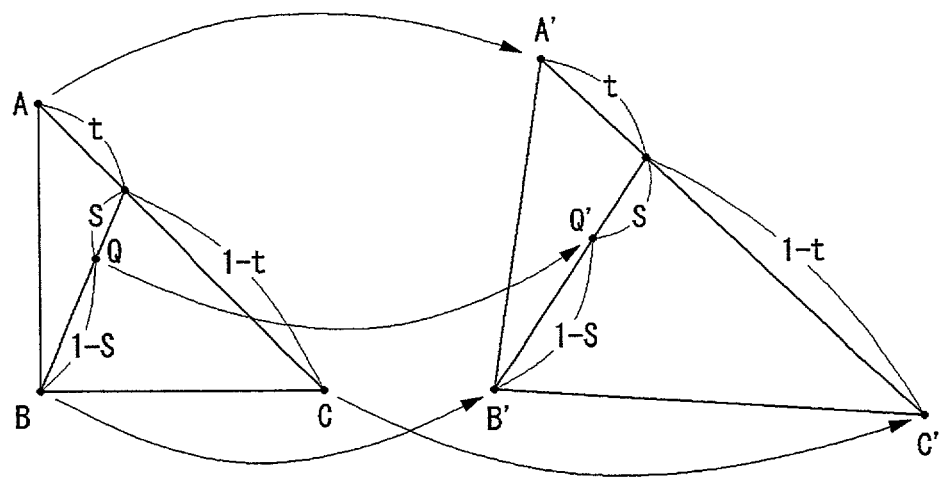
FIG. 20 shows a procedure by which to obtain points in the destination polygon corresponding to points in the source polygon.

FIG. 20 shows a method for computing the correspondence relation between points other than the lattice points, from the corresponding point file. Since the corresponding point file includes information on the lattice points only, data corresponding to interior points of the polygon need to be computed separately. FIG. 20 shows a correspondence between a triangle ABC which corresponds to a lower half of the source polygon R1 shown in FIG. 19 and a triangle A' B' C' which corresponds to that of the destination polygon R2 shown in FIG. 19. Now, suppose that an interior point Q, of the triangle ABC, interior-divides the line segment AC in the ratio t:(1−t) and the point Q interior-divides a line segment connecting such the interior-divided point and a point B in the ratio s:(1−s). Thus, it may be thought of as in a manner that a corresponding point Q', which corresponds to the point Q, in a triangle A' B' C' in a destination polygon side interior-divides a line segment A' C', in the ratio t:(1−t) and the point Q' interior-divides a line segment connecting such the interior-divided point and a point B' corresponding to B in the ratio s:(1−s). In this case, it is preferable that the source polygon is divided into triangles, and interior points of the destination polygon are determined in the forms of interior-division of vectors concerning the triangle. When expressed in a vector skew field, the above becomes $$BQ=(1-s)\{(1-t)BA+tBC\},$$

thus, we have $$B'Q'=(1-s)\{(1-t)B'A'+tB'C'\}$$

Of course, a similar process will be performed on a triangle ACD which corresponds to an upper half of the source polygon R1 shown and a triangle A' C' D' which corresponds to that of the destination polygon R2.

Figure 21:
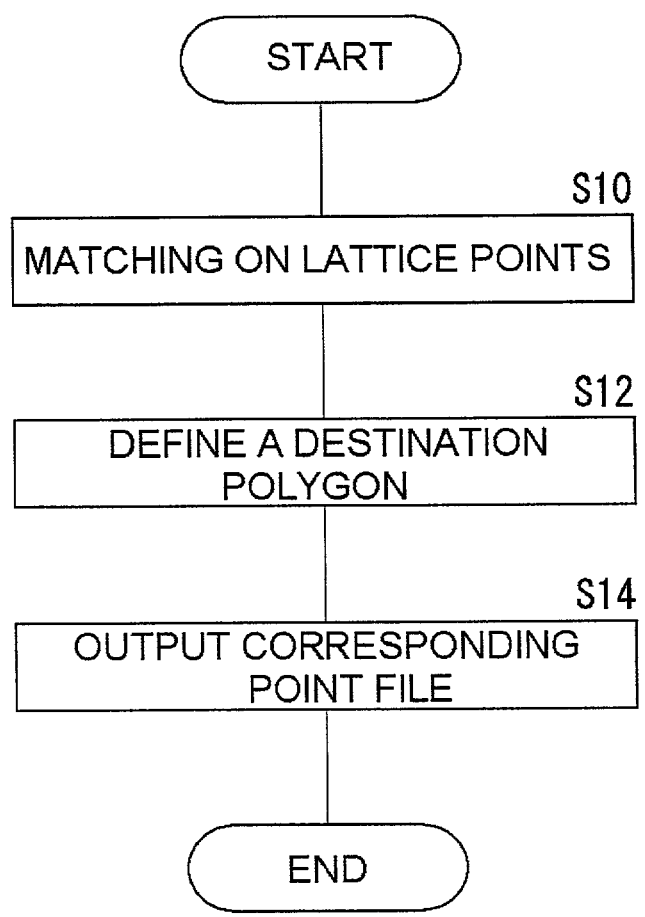
FIG. 21 is a flowchart showing a procedure for generating the corresponding point file according to a present embodiment.

FIG. 21 shows the above-described processing procedure. Firstly, the matching results on the lattice points taken on the first image I1 are acquired (S10) as shown in FIG. 19. Then, it is preferable that the pixel-by-pixel matching according to the premised technology is performed, so that a portion corresponding to the lattice points is extracted from those results. It is to be noted that the matching results on the lattice points may also be specified based on other matching techniques such as optical flow and block matching, instead of using the premised technology.

Thereafter, destination polygons are defined on the second image I2 (S12), as shown in the right side of FIG. 19. The corresponding point file is then output to memory, data storage or the like (S14). Preferably, the corresponding point file may also include data by which to identify the first image I1 with which it is related. Notably, in this embodiment, instead of two images, only one of the images is associated with the corresponding point data. The first image I1 and corresponding point file can be stored on an arbitrary recording device or medium, or may be transmitted directly via a network or broadcast or the like.

Figure 22:
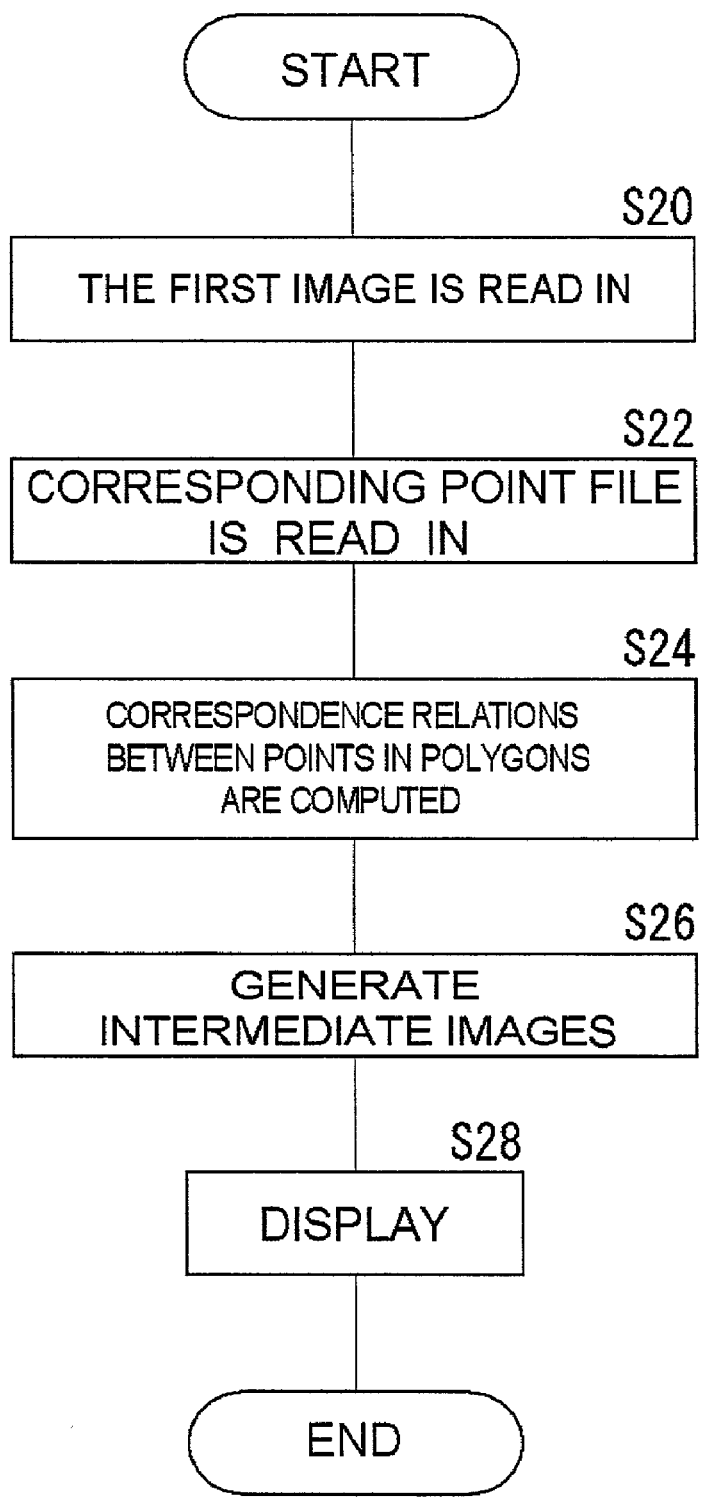
FIG. 22 is a flowchart showing a procedure for generating an intermediate image based on the corresponding point file.

FIG. 22 shows a procedure to generate intermediate images by using the corresponding point file. Firstly, the first image I1 only is read in (S20), and then the corresponding point file is read in (S22). Thereafter, the correspondence relation between points in source polygons and those of destination polygons is computed using a method such as that described with regard to FIG. 20 (S24). At this time, the correspondence relation for all pixels within the images can be acquired. As described in the premised technology, the coordinates and brightness or colors of points corresponding to each other are interior-divided in the ratio u:(1−u), so that an intermediate image in a position which interior-divides temporally in the ratio u:(1−u) between the first image I1 and the second image I2 can be generated (S26). However, different from the premised technology, in this embodiment, the colors are not interpolated, and the color of each pixel of the first image I1 is simply used as such without any alteration thereto. It is to be noted that not only interpolation but also extrapolation may be performed.

Figure 23:
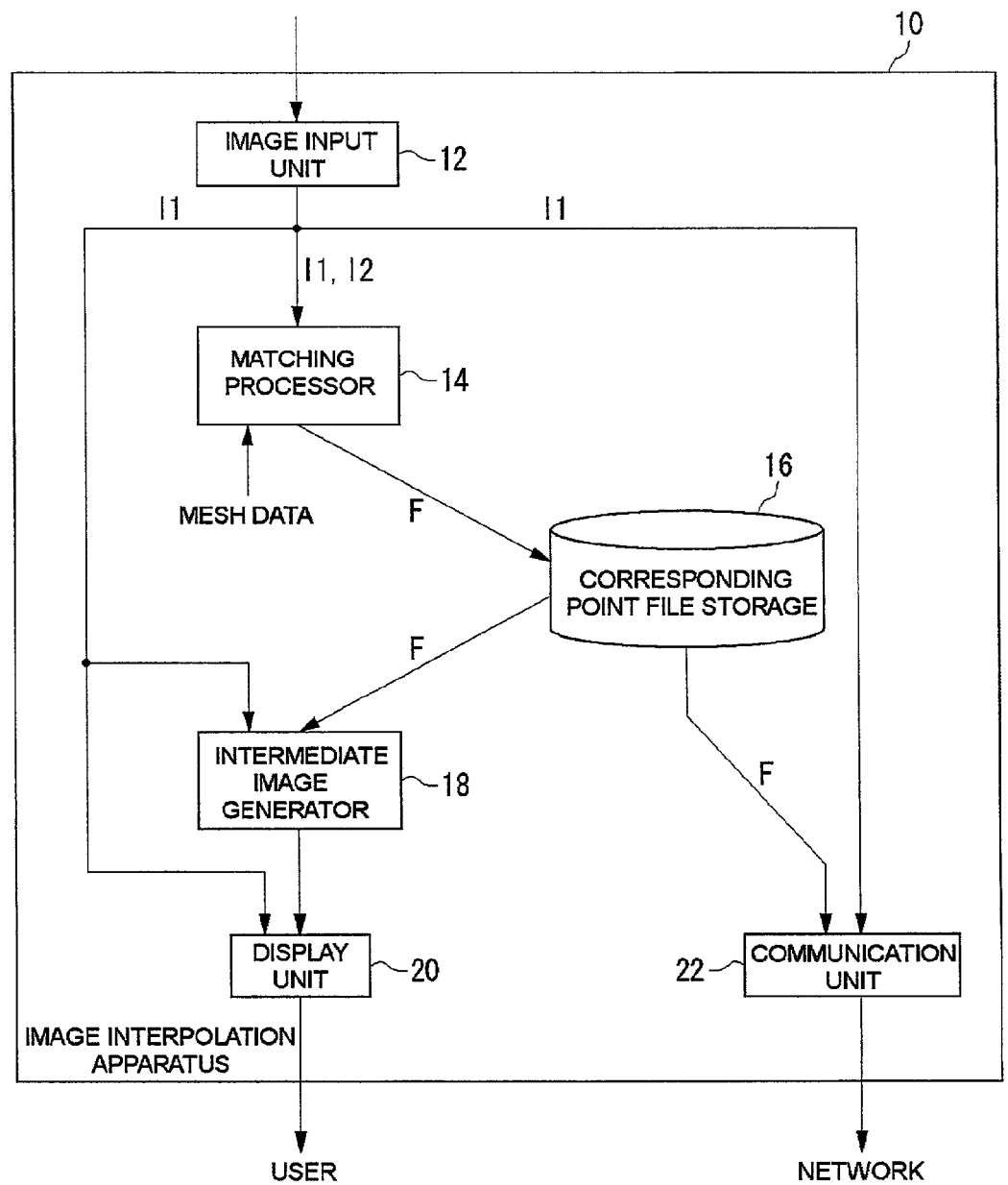
FIG. 23 shows a structure of an image interpolation apparatus according to a present embodiment.

FIG. 23 shows an embodiment of an image interpolation apparatus 10 which may perform the above-described processes or methods. The apparatus 10 includes: an image input unit 12 which acquires the first image I1 and second image I2 from an external storage, a photographing camera, a network or some other source as is known in the art; a matching processor 14 which performs a matching computation on these images using the premised technology or other technique, a corresponding point file storage 16 which stores the corresponding point file F generated by the matching processor 14, an intermediate image generator 18 which generates one or more intermediate images from the first image I1 and the corresponding point file F, and a display unit 20 which displays the first image I1 and intermediate images as an original motion picture by adjusting the number and timing of intermediate images. It is to be noted that the display unit 20 may also display the second image I2 at the end of the display of the interpolated images. Moreover, a communication unit 22 may also send out the first image I1 and the corresponding point file F to a transmission infrastructure such as a network or broadcast or the like according to an external request. In this case as well, the second image I2 may also be sent out. As shown in FIG. 23, mesh data, such as the size of the mesh, the positions of the lattice points and so forth, may also be input in the matching processor 14 either as fixed values or interactively.

By implementing the above-described structure, the first image I1 and the second image I2 which were input in the image input unit 12 are sent to the matching processor 14. The matching processor 14 performs a pixel-by-pixel matching computation in between images. Namely, both the images are referred to at the matching stage. The matching processor 14 generates the corresponding point file F based on the mesh data, and the thus generated file F is output to the corresponding point file storage 16.

In particular, the corresponding point file F may record points in the second image I2 and their correspondence to lattice points of a mesh taken on the first image I1. For example, when an image size is of 100×100 points, a pair of corresponding points are determined by designating a single point about each lattice point among 10000 combinations.

The corresponding point file F further stores color difference data for at least a pair of corresponding points. In a case where the base technology is utilized, correspondence is more likely for points whose colors are closer to each other, thus, it is expected that a color difference for a pair of corresponding points will be small. This will generally also be true where a matching technique other than one according to the base technology is utilized. Thus, even in the case where, for example, the color of each point is expressed by 8 bits, it is possible that the color difference data may be expressed by, for example, 3 bits. Moreover, even in a case where a color difference is larger and exceeds the thus determined bit number, the accuracy of the matching should have been primarily considered instead, so that serious errors would not be caused in many cases even if the color is expressed by the maximum value in 3 bits, namely, "111". Further, in a case where a sufficiently large range is anticipated or assumed for the color difference, it may be possible to constrain the color to 3 bits as a total by quantizing the range in a relatively coarse manner.

It is to be noted that the difference data usually shows a statistical bias with a center at zero. Thus, it is preferable that the difference data are first entropy-coded and thereafter stored in the corresponding point file F.

Moreover, the matching processor 14 may entropy-code the difference data and thereafter store the entropy-coded difference data in the corresponding point file F.

The intermediate image generator 18 reads out the corresponding point file F upon request from a user or due to other factors, and generates an intermediate image or images. In this interpolation, one of the two images I1 and I2, positional information on the pair of the corresponding points and the color difference data are utilized. This intermediate image is sent to the display unit 20, where the time adjustment of image output is performed, so that motion pictures or morphing images are displayed. As evident from this operation, the intermediate image generator 18 and the display unit 20 may be provided in a remote terminal (not shown) which is separated from the apparatus 10, for example, a remote terminal connected to a network which is also connected to communication 22 as described below. In this case, the terminal can receive relatively light data (low data volume) comprised of the first image I1 and the corresponding point file F and can independently reproduce motion pictures.

Moreover, the intermediate image generator 18 may generate the intermediate image by "moving" a point within the first image according to the positional information and varying the pixel value (e.g. color) of the point based on the difference data.

The communication unit 22 is structured and provided on the assumption that there is provided a remote terminal as described above. The communication unit 22 sends out the first image I1 and the corresponding point file F via a network or broadcast or the like, so that motion pictures can be displayed at the remote terminal side. Of course, the remote terminal may also be provided for the purpose of storage instead of display.

An experiment was carried out according to the processing of the present embodiments. For example, when using images of 256×256 pixels or a similar size for the first image and second image, a satisfactory morphing or motion picture compression effect was obtained by setting the lattice points at intervals of 10 to some tens of pixels in the vertical and horizontal directions. In these cases, the size of the corresponding point file was generally under approximately 10 kilobytes, and it was confirmed that high image quality with a small data amount could be achieved.

Moreover, although the present embodiments have been described in a way that is advantageous for terminals such as portable phones and the like, the present invention can be applied to arbitrary image related equipment in general.

Although the present invention has been described by way of exemplary embodiments, it should be understood that many changes and substitutions may be made by those skilled in the art without departing from the spirit and the scope of the present invention which is defined by the appended claims.

What is claimed is:

1. An image interpolation method, comprising:
acquiring a first image and a second image;
computing a matching between the first image and the second image by detecting corresponding points which correspond between the images;
quantizing the range of attribute values of the corresponding points in the first image and second image in a relatively coarse manner;
calculating difference data on the attribute values of the corresponding points based on the quantized range of attribute values; and
generating a corresponding point file based on the matching, where the corresponding point file comprises positional information on the corresponding points and the difference data on attribute values of the corresponding points.

2. An image interpolation method according to claim 1, wherein the difference data on attribute values comprises a difference between an attribute value of a point in the first image and an attribute value of a corresponding point in the second image.

3. An image interpolation method according to claim 1, wherein said attribute values of the corresponding points comprise color values of the corresponding points.

4. An image interpolation method according to claim 1, wherein the difference data are entropy-coded and, thereafter, the entropy-coded difference data are stored in the corresponding point file.

5. An image interpolation method, comprising:
acquiring a corresponding point file which describes a matching result of a first image and a second image wherein the corresponding point file comprises positional information on points which correspond between the first image and the second image and difference data of attribute values of points which correspond between the first image and the second image, wherein the difference data of attribute values comprises data obtained by quantizing the range of attribute values of the points which correspond in a relatively coarse manner and calculating difference data on the corresponding points based on the quantized range of attribute values of the corresponding points; and
generating an intermediate image based on the first image and the second image by performing interpolation based on the first image and the corresponding point file.

6. An image interpolation apparatus, comprising:
an image input unit which acquires a first image and a second image;
a matching processor which computes a matching between the first image and the second image by detecting points that correspond between the images, quantizes the range of pixel values of the corresponding points in the first image and second image in a relatively coarse manner, computes difference data of pixel values on the points that correspond between the images based on the guantized range of pixel values, and generates a corresponding point file,
wherein the corresponding point file comprises positional information on the points that correspond between the images and the difference data of pixel values on the points that correspond between the images.

7. An image interpolation apparatus according to claim 6, wherein said matching processor detects points on the second image that correspond to lattice points of a mesh provided on the first image, and based on a thus detected result a destination polygon corresponding to the second image is defined on a source polygon that constitutes the mesh on the first image.

8. An image interpolation apparatus according to claim 6, wherein said matching processor entropy-codes the difference data and thereafter stores the entropy-coded difference data in the corresponding point file.

9. An image interpolation apparatus, comprising:
a communication unit which acquires a corresponding point file which describes a matching result of a first image and a second image wherein the corresponding point file comprises positional information on points which correspond between the first image and the second image and difference data of attribute values of points which correspond between the first image and the second image, wherein the difference data of attribute values comprises data obtained by guantizing the range of attribute values of the points which correspond in a relatively coarse manner and calculating difference data on the corresponding points based on the quantized range of attribute values; and
an intermediate image generator which generates an intermediate image based on the first image and the second image by performing interpolation based on the first image and the corresponding point file.

10. An image interpolation apparatus according to claim 9, further comprising a display unit which displays at least the intermediate image.

11. An image interpolation apparatus according to claim 9, further comprising a corresponding point file storage unit for storing the corresponding point file in a manner such that the corresponding point file is associated with the first image.

12. An image interpolation apparatus according to claim 10, further comprising a corresponding point file storage unit for storing the corresponding point file in a manner such that the corresponding point file is associated to the first image.

13. An image interpolation apparatus according to claim 9, wherein said intermediate image generator generates said intermediate image by moving a point within the first image according to the positional information and varying the attribute value of the point based on the difference data.

14. An image interpolation apparatus according to claim 10, wherein said intermediate image generator generates said intermediate image by moving a point within the first image according to the positional information and varying the attribute value of the point based on the difference data.

15. An image interpolation apparatus according to claim 11, wherein said intermediate image generator generates said intermediate image by moving a point within the first image according to the positional information and varying the attribute value of the point based on the difference data.

16. A data medium storing a computer program executable by a computer, the program comprising the functions of:
acquiring a first image and a second image;
computing a matching between the first image and the second image by detecting corresponding points which correspond between the images;
quantizing a range of attribute values of the corresponding points in the first image and second image in a relatively coarse manner;
calculating difference data on the attribute values of the corresponding points based on the quantized range of attribute values; and generating a corresponding point file based on the matching where the corresponding point file comprises positional information on the corresponding points and the difference data on attribute values of the corresponding points.

17. A data medium storing a computer program executable by a computer, the program comprising the functions of:

acquiring a corresponding point file which describes a matching result of a first image and a second image wherein the corresponding point file comprises positional information on points which correspond between the first image and the second image; and difference data of attribute values of points which correspond between the first image and the second image, wherein the difference data of attribute values comprises data obtained by quantizing the range of attribute values of the points which correspond in a relatively coarse manner and calculating difference data of the corresponding points based on the quantized range of attribute values; and generating an intermediate image based on the first image and the second image by performing interpolation based on the first image and the corresponding point file.

18. The data medium according to claim 17, wherein said intermediate image does not relate to a known frame between said first image and said second image.

19. An image interpolation method, comprising:

acquiring a first image and a second image;

computing a matching between the first image and the second image by detecting corresponding points which correspond between the images, said matching further comprising computing positional information for said corresponding points and difference data on attribute values for the corresponding points, wherein the difference data is computed using quantized attribute values obtained by quantizing a range of attribute values of the corresponding points in the first image and second image in a relatively coarse manner; and generating a corresponding point file, wherein the corresponding point file comprises said positional information and said difference data.

* * * * *